US012558809B2

(12) United States Patent
Le Roux et al.

(10) Patent No.: US 12,558,809 B2
(45) Date of Patent: Feb. 24, 2026

(54) 3D PRINTING SYSTEM

(71) Applicant: Icon Technology, Inc., Austin, TX (US)

(72) Inventors: Alex Le Roux, Austin, TX (US);
Henry Wang, Austin, TX (US);
Nathan P. Wang, Austin, TX (US)

(73) Assignee: ICON Technology, Inc., Austin, TX (US)

( * ) Notice: Subject to any disclaimer, the term of this patent is extended or adjusted under 35 U.S.C. 154(b) by 0 days.

(21) Appl. No.: 17/714,429

(22) Filed: Apr. 6, 2022

(65) Prior Publication Data

US 2022/0355508 A1 Nov. 10, 2022

Related U.S. Application Data

(60) Provisional application No. 63/185,179, filed on May 6, 2021.

(51) Int. Cl.
B28B 1/00 (2006.01)
B28B 13/02 (2006.01)
(Continued)

(52) U.S. Cl.
CPC .............. B28B 1/001 (2013.01); B28B 13/02 (2013.01); *B33Y 10/00* (2014.12); *B33Y 30/00* (2014.12)

(58) Field of Classification Search
CPC ... B29C 64/232; B29C 64/236; B29C 64/277; B29C 64/20; B29C 64/00; B33Y 30/00;
(Continued)

(56) References Cited

U.S. PATENT DOCUMENTS 3,308,922 A * 3/1967 Ellis ......................... C03B 35/10
198/433
3,566,603 A * 3/1971 Chadwick ............... F16G 13/16
198/852
(Continued)

FOREIGN PATENT DOCUMENTS

CN 205766713 U * 12/2016
CN 111940724 A * 11/2020
(Continued)

OTHER PUBLICATIONS

Mun, K. English machine translation of Kr 101526827B1: "3D Printing Apparatus and Constructing Method of Steel Frame Concrete Structure Using the Same". Espacenet. EPO. 2023 (Year: 2023).*
(Continued)

*Primary Examiner* — Susan D Leong
*Assistant Examiner* — Jonathan B Woo
(74) *Attorney, Agent, or Firm* — KOKKA & BACKUS, PC

(57) ABSTRACT

A 3D printing system for construction includes a 3D printing assembly having a pair of tower assemblies, and a pair of rail assemblies. The pair of tower assemblies are movably disposed on the pair of rail assemblies. Each of the pair of rail assemblies defines a longitudinal axis and the pair of tower assemblies are configured to move on the pair of rail assemblies in a direction along the longitudinal axis. Each of the rail assemblies includes a plurality of rail parts. Each of the rail parts includes at least one track extending along the longitudinal axis, an aligning protrusion at a first end portion thereof, and an aligning groove at a second end portion thereof. The aligning groove is configured to accept the aligning protrusion of an adjacent rail part.

18 Claims, 34 Drawing Sheets

(51) Int. Cl.
 *B33Y 10/00* (2015.01)
 *B33Y 30/00* (2015.01)
(58) Field of Classification Search
 CPC .. B28B 1/00; B28B 1/001; B41J 25/00; B41J
 11/00; F16L 3/00; F16G 13/00; H02G
 11/00
 See application file for complete search history.

(56) References Cited

U.S. PATENT DOCUMENTS

| | | | | |
|---|---|---|---|---|
| 8,029,710 | B2 * | 10/2011 | Khoshnevis | B25J 19/002 |
| | | | | 212/312 |
| 2017/0349419 | A1 * | 12/2017 | Lee | B66F 11/04 |
| 2020/0199862 | A1 | 6/2020 | Le Roux | |
| 2020/0282593 | A1 | 9/2020 | Le Roux | |
| 2022/0009160 | A1 * | 1/2022 | Chen | B29C 64/307 |

FOREIGN PATENT DOCUMENTS

| | | | | | |
|---|---|---|---|---|---|
| DE | 20119289 | U1 * | 2/2002 | | B25J 19/0025 |
| JP | H1179611 | A * | 3/1999 | | |
| KR | 1526827 | B1 * | 6/2015 | | |
| KR | 20180007806 | A * | 1/2018 | | B29C 64/106 |

| | | | | |
|---|---|---|---|---|
| WO | 2018136475 | | 7/2018 | |
| WO | WO-2019134372 | A1 * | 7/2019 | B22C 5/12 |
| WO | 2020180323 | | 9/2020 | |
| WO | 2020180324 | | 9/2020 | |

OTHER PUBLICATIONS

Inoue, S. et al. English machine translation of JPH1179611A: "Inclined Lift Device". Espacenet. EPO. 2023 (Year: 2023).*

Chen, H. et al. English machine translation of CN 111940724 A: "A modular additive and subtractive material manufacturing device and method". Espacenet. EPO. 2023. (Year: 2023).*

Kim, H. Y. et al. English machine translation of KR 20180007806 A: "Composite Production Equipment Having Plurality of Gantry". Espacenet. EPO. 2023. (Year: 2023).*

Jiang, X et al. English machine transtion of CN 205766713 U: "Building 3D printing device". Espacenet. EPO. 2023. (Year: 2023).*

Heigl Helmuth. "English Machine Transation of DE-20119289-U1". Dec. 19, 2024. Espacenet. EPO. (Year: 2024).*

Si Z. "English Machine Translation of WO-2019134372-A1". Dec. 19, 2024. Espacenet. EPO. (Year: 2024).*

Extended Search Report issued to related EP Application No. 22168614.0, dated Sep. 26, 2022, 11 pages.

* cited by examiner

3D PRINTING SYSTEM

PRIORITY CLAIM

This application claims priority to U.S. Provisional Patent Application No. 63/185,179, filed on May 6, 2021, the entire contents of which are hereby incorporated by reference and relied upon.

BACKGROUND

The present disclosure generally relates to a three-dimensional (3D) printing system for the construction of structures (e.g., dwellings, buildings, etc.). More particularly, the present disclosure is directed to a rail assembly for use with a 3D printing system.

Structures (e.g., dwellings, buildings, sheds, etc.) may be manufactured with a multitude of different materials and construction methods. Among the materials commonly used in the construction of structures is concrete. For example, concrete may be used to form the foundation as well as the exterior walls of a structure.

SUMMARY

The present disclosure provides a new and innovative 3D printing system for the construction of structures. In an embodiment, a 3D printing system for construction may include a 3D printing assembly having a pair of tower assemblies and a pair of rail assemblies. The pair of tower assemblies may be movably disposed on the pair of rail assemblies. Each of the pair of rail assemblies may define a longitudinal axis and the pair of tower assemblies may be configured to move on the pair of rail assemblies in a direction along the longitudinal axis. Each of the rail assemblies may include a plurality of rail parts. Each of the rail parts may include at least one track extending along the longitudinal axis, an aligning protrusion at a first end portion thereof, and an aligning groove at a second end portion thereof. The aligning groove may be configured to accept the aligning protrusion of an adjacent rail part.

In an embodiment, the aligning protrusion and the aligning groove may be formed at a bottom portion of the first end portion and the second end portion, respectively.

In an embodiment, each of the rail parts may further include a first hole at the first end portion, and a second hole at the second end portion. The second hole may be configured to be secured with the first hole of an adjacent rail part through a fastener.

In an embodiment, each of the rail parts may further include a level adjustment jack configured to support each of the rail parts and adjust a distance between a corresponding rail part and a ground.

In an embodiment, each of the rail parts may further include a plurality of rail rollers disposed at a bottom portion of each of the rail parts.

In an embodiment, the level adjustment jack may be configured to adjust the distance between the corresponding rail part and the ground so that the rail rollers do not contact the ground during a printing operation of the 3D printing system.

In an embodiment, the 3D printing system may further include a spacer configured to be disposed under the level adjustment jack to level the rail parts.

In an embodiment, each of the rail parts may further include a forklifting hole at a side portion of each of the rail parts.

In an embodiment, each of the rail assemblies may include a stop bar disposed at an end portion of each of the rail assemblies.

In an embodiment, each of the rail assemblies may include a limiter flag.

In an embodiment, the at least one track includes a first roller track on which rollers of the pair of tower assemblies are configured to move in the direction along the longitudinal axis.

In an embodiment, the first roller track may include an elongate protrusion extending along the longitudinal axis.

In an embodiment, the at least one track may include a drag chain track configured to accept a drag chain of the pair of tower assemblies.

In an embodiment, each of the rail parts may further include a gear rack extending along the longitudinal axis. The gear rack may be configured to be mated with a gear of the pair of tower assemblies.

In an embodiment, the 3D printing assembly may further include a beam assembly extending in a direction perpendicular to the longitudinal axis and movably coupled to each of the tower assemblies.

In an embodiment, the 3D printing assembly may further include a shuttle assembly movably disposed on the beam assembly and configured to deposit an extrudable building material to form a structure.

Additional features and advantages of the disclosed 3D printing system are described in, and will be apparent from, the following Detailed Description and the Figures.

BRIEF DESCRIPTION OF THE FIGURES

FIG. 27(*b*) is an expanded side view of the rail part of FIG. 26 with the level adjustment jack lowered.

Figure 1:
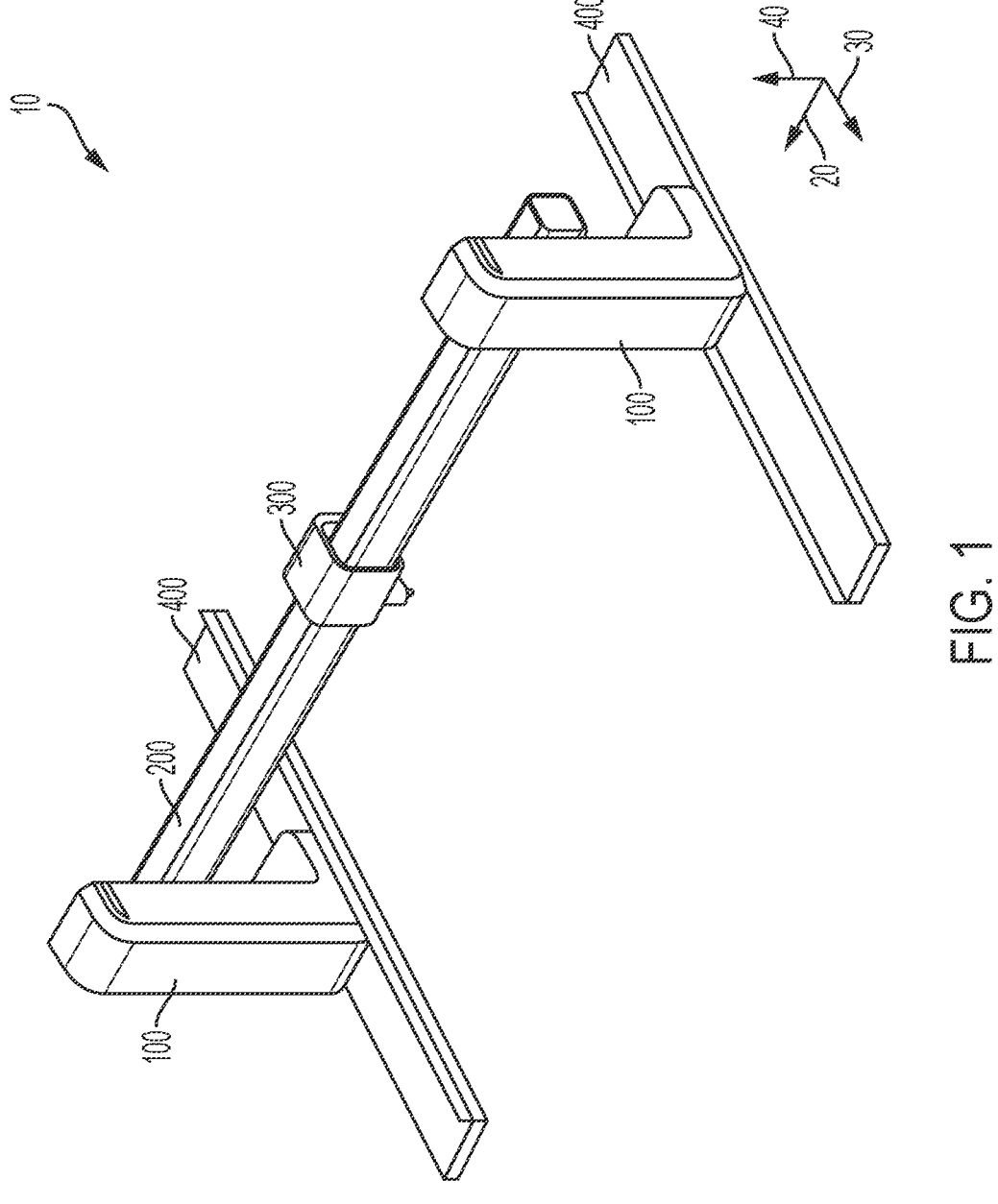
FIG. 1 is a perspective view of showing a 3D printing system according to a non-limiting embodiment of the present disclosure.
Figure 2:
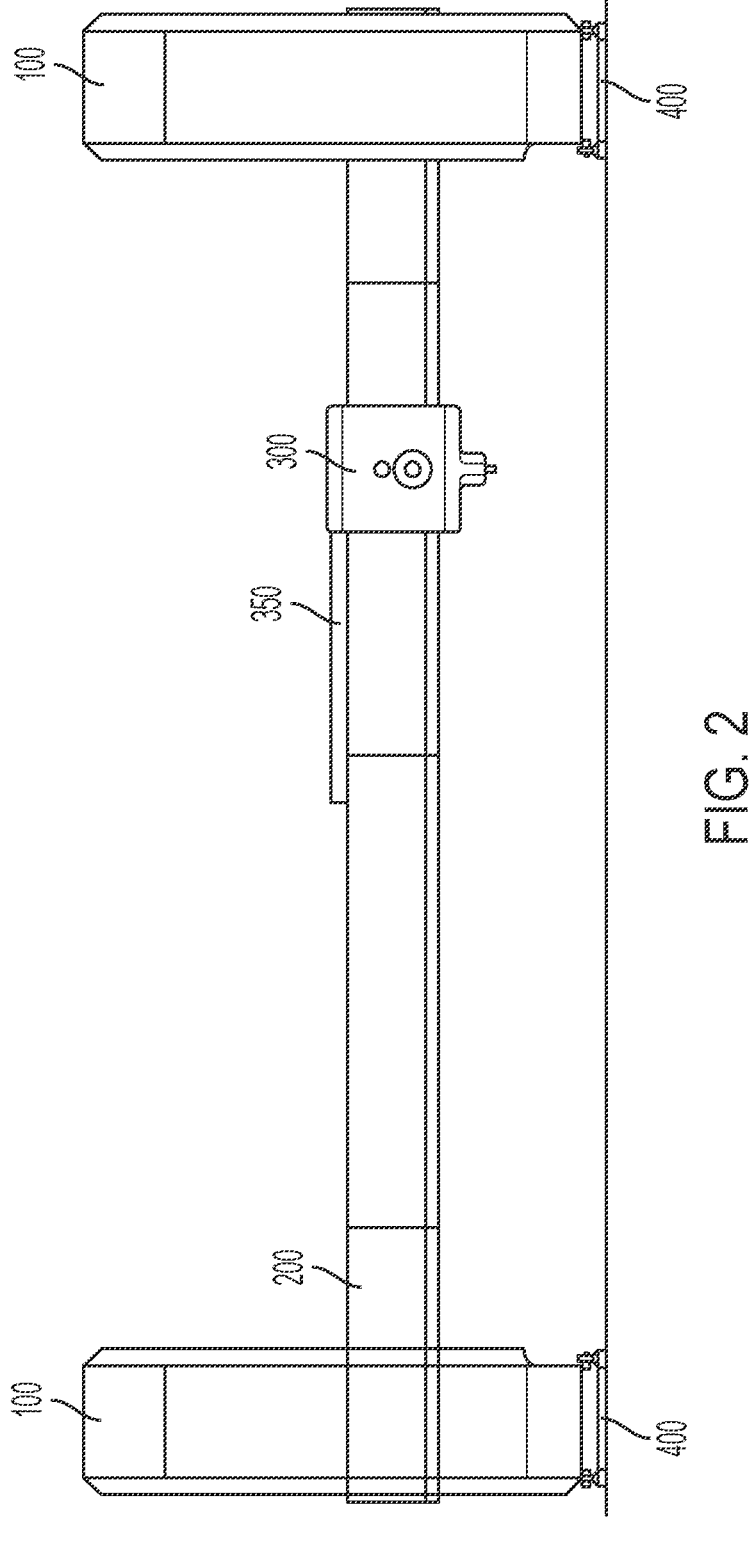
FIG. 2 is a front view of showing the 3D printing system of FIG. 1.
Figure 3:
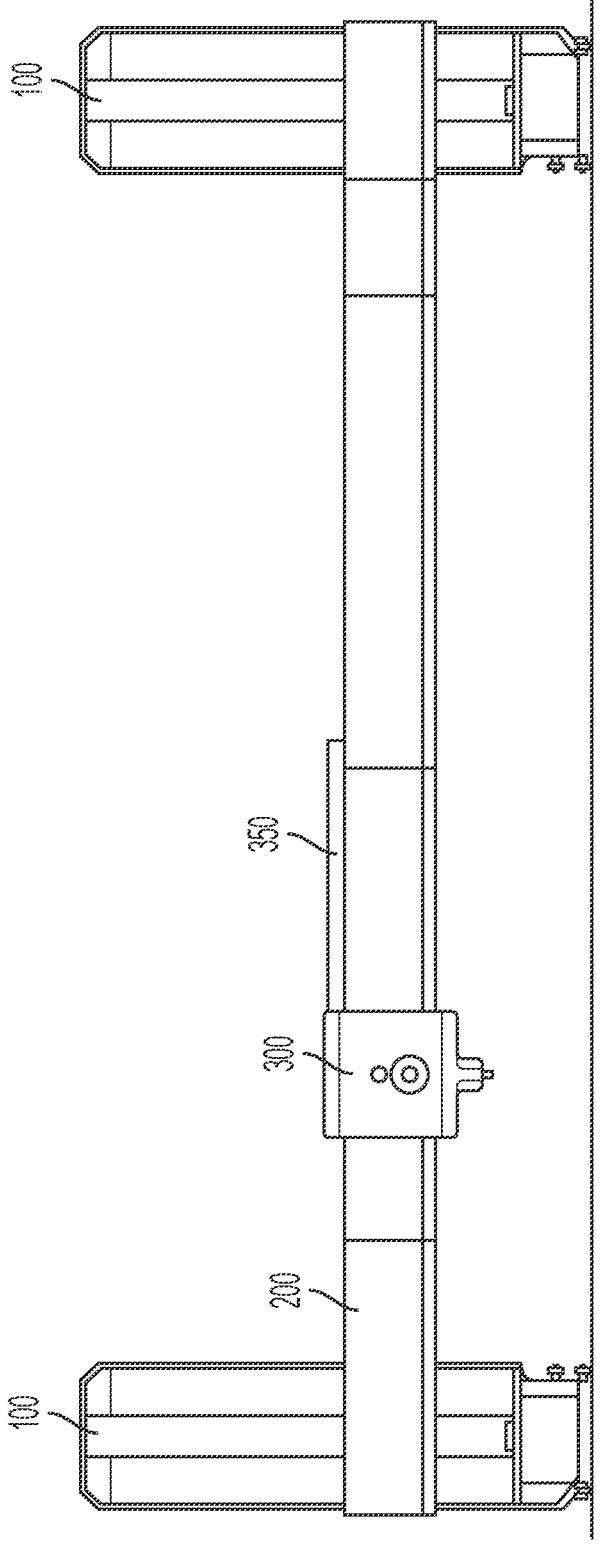
FIG. 3 is a rear view of showing the 3D printing system of FIG. 1.
Figure 4:
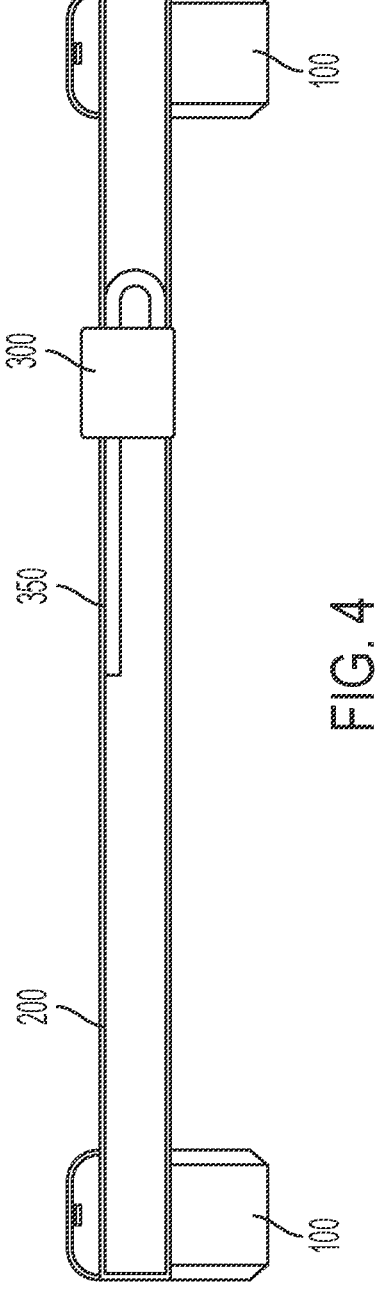
FIG. 4 is a top view of showing the 3D printing system of FIG. 1.
Figure 5:
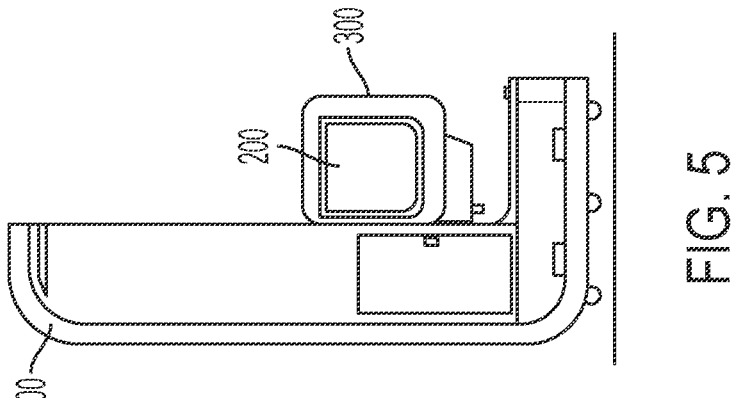
FIG. 5 is a side view of showing the 3D printing system of FIG. 1.

The reader will appreciate the foregoing details, as well as others, upon considering the following detailed description of certain non-limiting embodiments of devices according to the present disclosure. The reader also may comprehend certain of such additional details upon using the devices described herein.

DETAILED DESCRIPTION

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

As used herein, the terms "about," "approximately," "substantially," "generally," and the like mean plus or minus 10% of the stated value or range. In addition, as used herein, an "extrudable building material" refers to a building material that may be delivered or conveyed through a conduit (e.g., such as a flexible conduit) and extruded (e.g., via a nozzle or pipe) in a desired location. In some embodiments, an extrudable building material includes a cement mixture (e.g., concrete, cement, etc.).

As used herein, the term "computing device" refers to any suitable device (or collection of devices) that is configured to execute, store, and/or generate machine readable instructions (e.g., non-transitory machine readable medium). The term may specifically include devices, such as, computers (e.g., personal computers, laptop computers, tablet computers, smartphones, personal data assistants, etc.), servers, controllers, etc. A computing device may include a processor and a memory, wherein the processor is to execute machine readable instructions that are stored on the memory.

As previously described above, structures (e.g., dwellings, buildings, sheds, etc.) may be manufactured with a multitude of different materials and construction methods. Traditionally, a building (e.g., a dwelling) may be constructed upon a composite slab or foundation that comprises concrete reinforced with re-bar or other metallic materials. The structure itself may then be framed (e.g., with wood and/or metal framing members), and then an outer shell and interior coverings (e.g., plywood, sheet rock, etc.) may be constructed around the structural framing. Utilities (e.g., water and electrical power delivery as well as vents and ducting for air conditioning and heating systems) may be enclosed within the outer shell and interior covers along with insulation. This method of designing and constructing a structure is well known and has been successfully utilized in constructing an uncountable number of structures; however, it requires multiple constructions steps that may not typically be performed simultaneously and that often require different skills and trades to complete. As a result, this process for constructing a structure can extend over a considerable period (e.g., six months to a year or more). Such a lengthy construction period is not desirable in circumstances that call for the construction of a structure or multiple structures in a relatively short period of time.

Accordingly, embodiments disclosed herein include construction systems and methods of construction that allow a structure (such as a personal dwelling) to be constructed in a fraction of the time associated with traditional construction methods. In particular, embodiments disclosed herein utilize additive manufacturing techniques (e.g., three-dimensional (3D) printing) in order to produce a structure more quickly and economically in a systematic manner.

Referring to FIGS. 1 to 5, a 3D printing system 10 according to some embodiments is shown. The 3D printing system 10 may include a pair of tower assemblies 100, an x-beam assembly 200, a shuttle assembly 300, and a pair of rail assemblies 400. The pair of tower assemblies 100 may be movably disposed on the rail assemblies 400. The rail assemblies 400 may provide a smooth, clean level surface for the tower assemblies 100 to roll along. The shuttle assembly 300 may be movably disposed on the x-beam assembly 200. The 3D printing system 10 may be configured for a structure (e.g., a personal dwelling) via additive manufacturing, specifically 3D printing, for example, on a foundation or a target place (e.g., place formed between the rail assemblies 400) for the construction.

In particular, the 3D printing system 10 (via tower assemblies 100, x-beam assembly 200, and rail assemblies 400) may be configured to controllably move or actuate the shuttle assembly 300 relative to the target place along each of a plurality of orthogonal movement axes or directions 20 (x-axis), 30 (y-axis), 40 (z-axis) such that the shuttle assembly 300 may controllably deposit an extrudable building material to form a structure (e.g., personal dwelling). In some embodiments, as shown in FIG. 1, axes 20, 30, 40 may be each orthogonal to one another—with x-axis 20 being orthogonal to both axes 30, 40, y-axis 30 being orthogonal to axes 20 and 40, and z-axis 40 being orthogonal to axes 20 and 30.

In some embodiments, the pair of rail assemblies 400 may be spaced from each other and parallel to each other. The opposite ends of each of the rail assemblies 400 may be generally aligned with one another across the target place. In addition, each of the rail assemblies 400 may extend parallel to y-axis 30 (and thus, each rail assembly 400 may extend in a direction that is perpendicular to the direction of x-axis 20 and the direction of z-axis 40). In some embodiments, the distance between the rail assemblies 400 may be in a range of about 20 feet to 50 feet. In other embodiments, the rail assemblies 400 may maintain any other suitable distance away from each other.

The tower assemblies 100 may be movably coupled to a corresponding one of the rail assemblies 400 so that the tower assemblies 100 may traverse along y-axis 30 during operations. In addition, the x-beam assembly 200 may be movably coupled to each of the tower assemblies 100 so that the x-beam assembly 200 may traverse up and down along z-axis 40 during operations.

Figure 6:
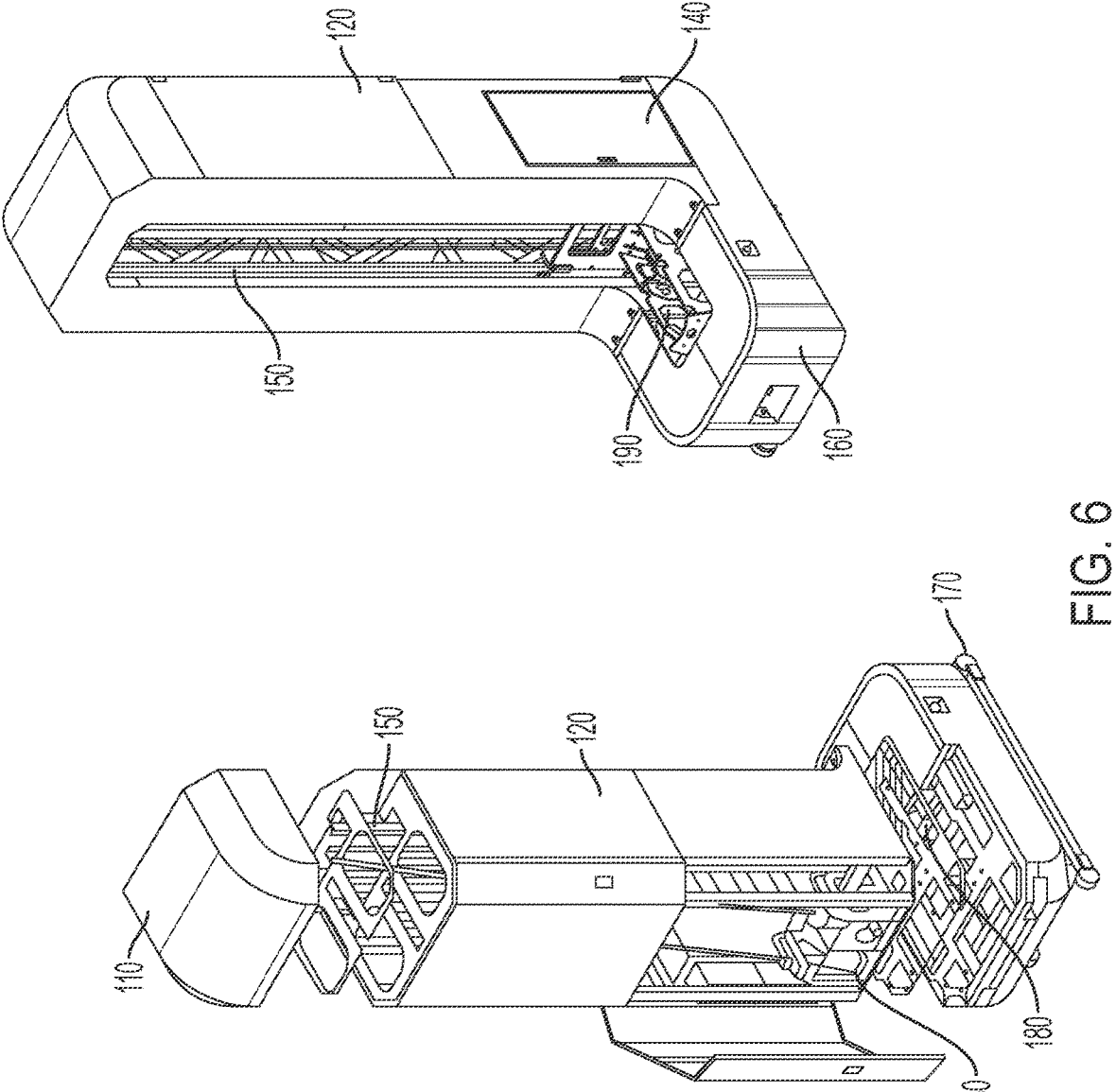
FIG. 6 is a perspective view of tower assemblies according to a non-limiting embodiment of the present disclosure.
Figure 9:
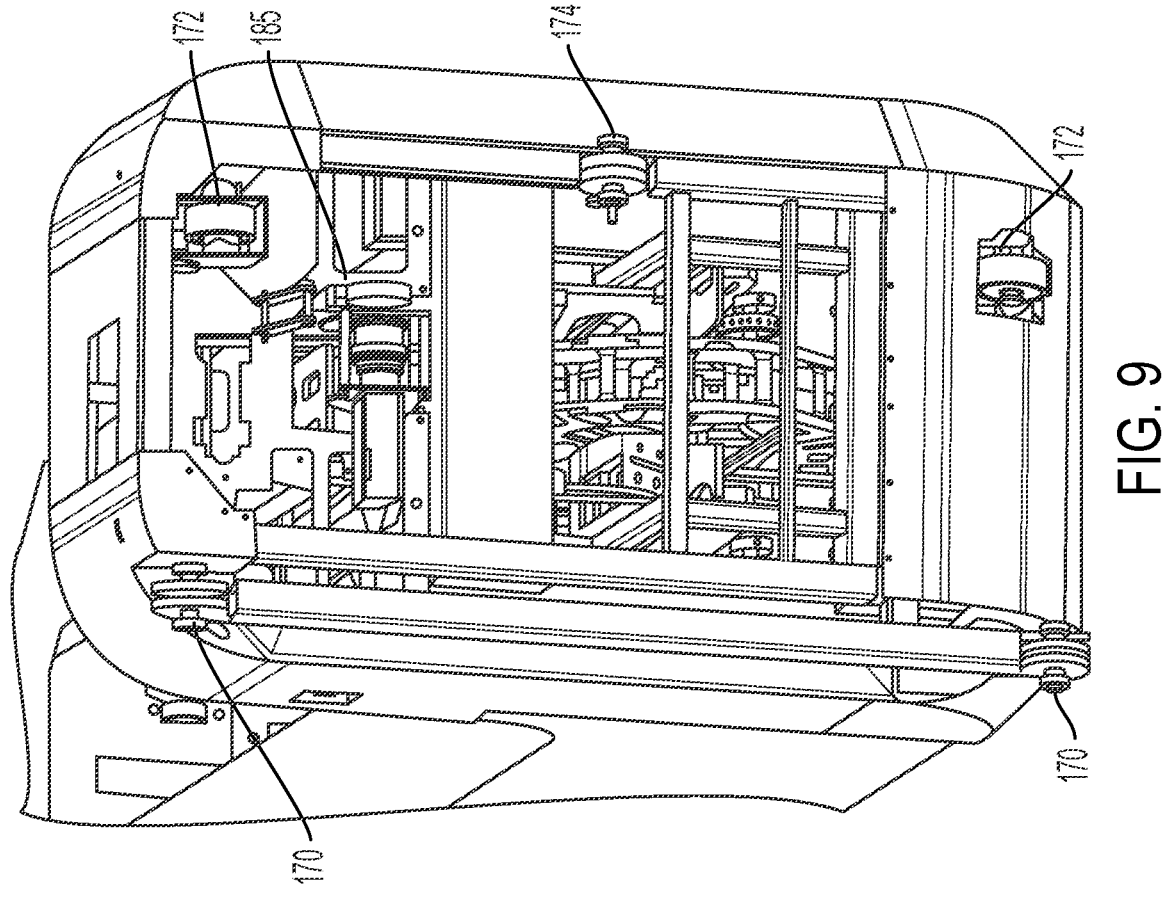
FIG. 9 is a perspective bottom view of the tower assembly of FIG. 6.

Referring to FIG. 6, each tower assembly 100 may include a top cap 110, a main body 120, a gear box/z-axis drive system 130, a control system 140, linear rails 150, a base 160, rollers 170 coupled to the base 160, a Y-axis drive system 180, and an x-beam interface 190 configured to be connected to the x-beam assembly 200. The gear box/z-axis drive system 130 may be configured to move the x-beam assembly 200 up and down (e.g., through the linear rails 150 and x-beam interface 190 that is connected to the x-beam assembly 200). The Y-axis drive system 180 may provide a motive force on the tower assembly 100 and move the tower assembly 100 along the respective rail assembly 400. For example, the Y-axis drive system 180 may include a gear 185, as shown in FIG. 9, and the gear 185 may be meshed with a gear rack 450 of the rail assemblies 400. The motive force from the Y-axis drive system 180 (e.g., a motor in the Y-Axis drive system) may be provided to the gear 185 and the gear rack 450 meshed with the gear 185, which enables the tower assemblies 100 to traverse back and forth along the rail assemblies 400. In some embodiments, the Y-axis drive system 180 may be located in the base 160 of the tower assembly 100.

The control system 140 may control overall movements/operations of the tower assembly 100, x-beam assembly 200, and shuttle assembly 300. In some embodiments, the control system 140 may be placed in each of the tower assemblies 100. In this case, in some embodiments, one of the control systems may serve as a main processor, and another control system may serve as a back-up processor. In other embodiments, the control system 140 may be placed in only one of the tower assemblies 100. In this case, the tower assembly that includes the control system 140 may control the movement/operation of the tower assembly that does not include the control system 140. One or more of the rollers 170 may be configured to engage with one or more tracks within the corresponding rail assembly 400 during operations to facilitate the movement of the tower assembly 100 along y-axis 30. In some embodiments, the rollers 170 may include a circumferential channel/groove (e.g., V-shape channel/groove) extending circumferentially about the rollers 170. The rollers 170 may engage and mate with the track (e.g., track 470) of a corresponding rail assembly 400 so that, during operations, each tower assembly 100 traverses axially with respect to the y-axis 30 along the rail assemblies 400 via rolling engagement between the rollers 170 and the tracks of the rail assembly 400.

Figure 7:
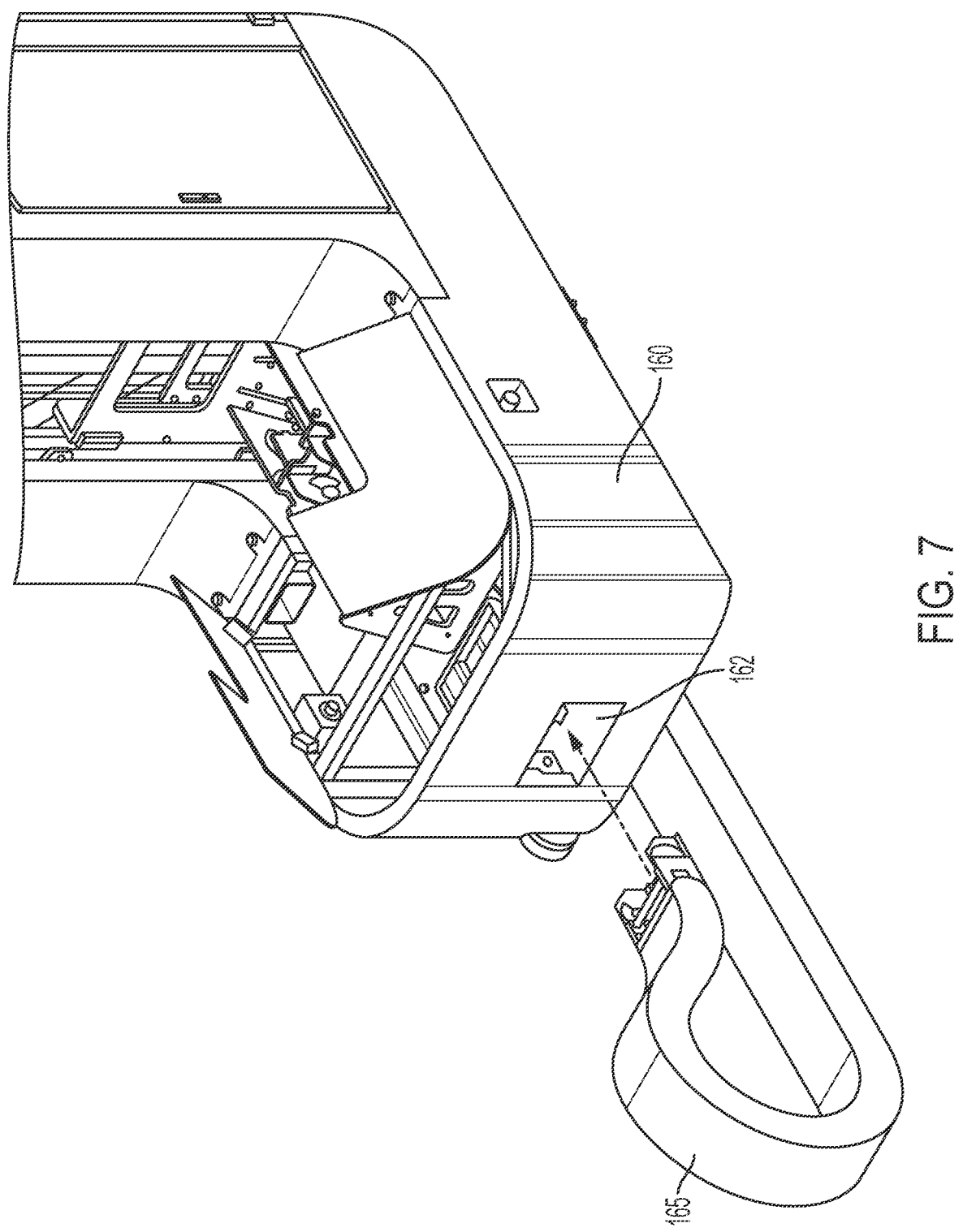
FIG. 7 is a perspective expanded view of the base of the tower assembly of FIG. 6 integrated with a drag chain.
Figure 8:
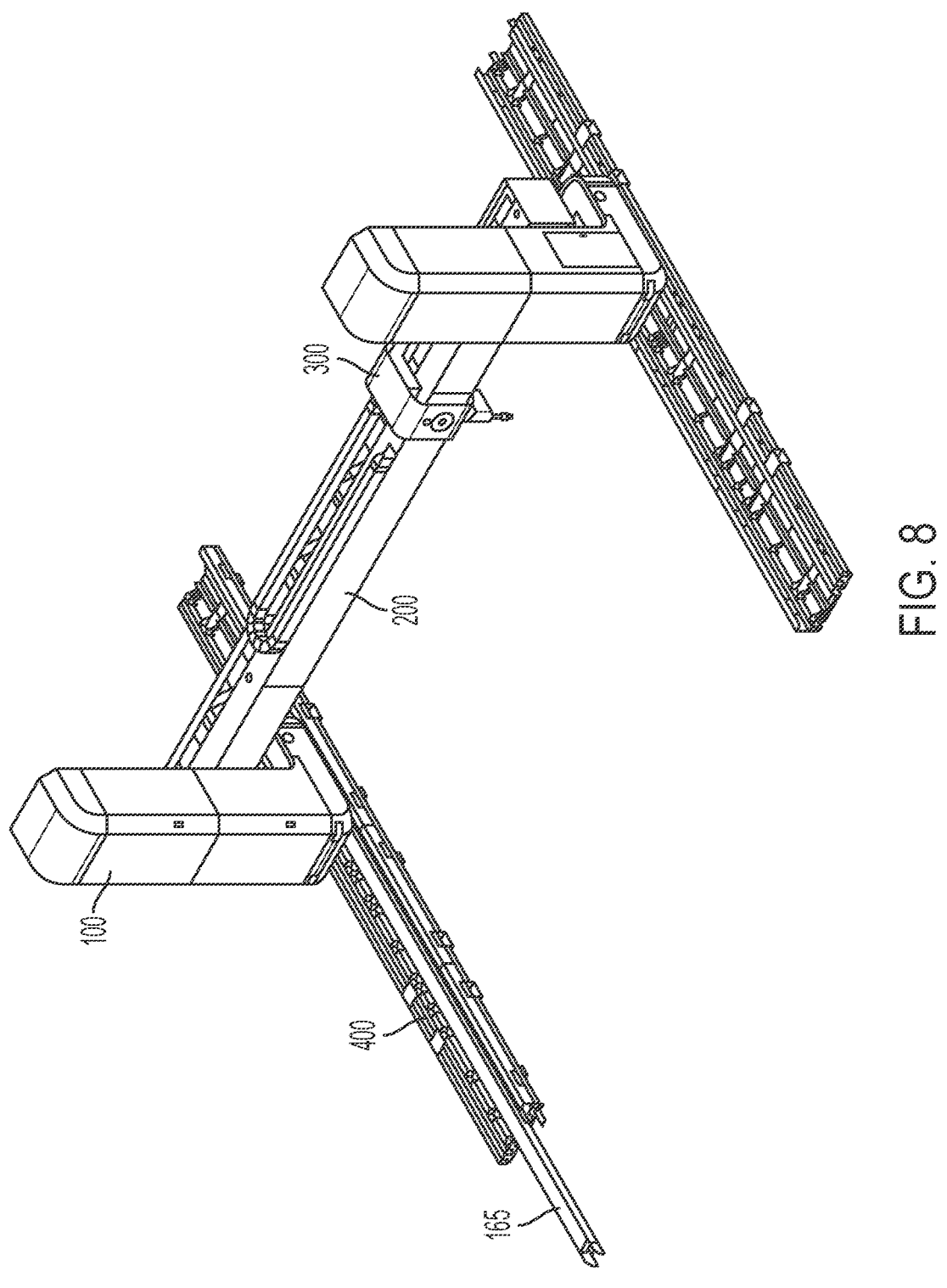
FIG. 8 is a perspective view of showing a 3D printing system integrated with the drag chain according to a non-limiting embodiment of the present disclosure.

Referring to FIGS. 7-8, the base 160 of each tower assembly 100 may include a drag hole 162 configured to accept a drag chain 165. The drag chain 165 may engage and mate with the drag chain track 460 of a corresponding rail assembly 400. The drag chain 165 may include a hose, electrical lines (e.g., cable lines), and/or pneumatic lines. The hose may be used to deliver an extrudable building material to the shuttle assembly 300. The electrical lines may include power cables and/or other cables for data communication.

As shown in FIG. 9, the tower assemblies 100 may further include additional rollers 172, 174. In some embodiments, these additional rollers 172, 174 may also include a circumferential channel/groove (e.g., V-shape channel/groove) extending circumferentially about the rollers 172, 174. In other embodiments, these additional rollers 172, 174 may not include any circumferential channel/groove (e.g., V-shape channel/groove). The additional rollers 172, 174 may also engage and mate with the tracks (e.g., tracks 440) of a corresponding rail assembly 400 to facilitate the movement of the tower assembly 100.

Figure 10:
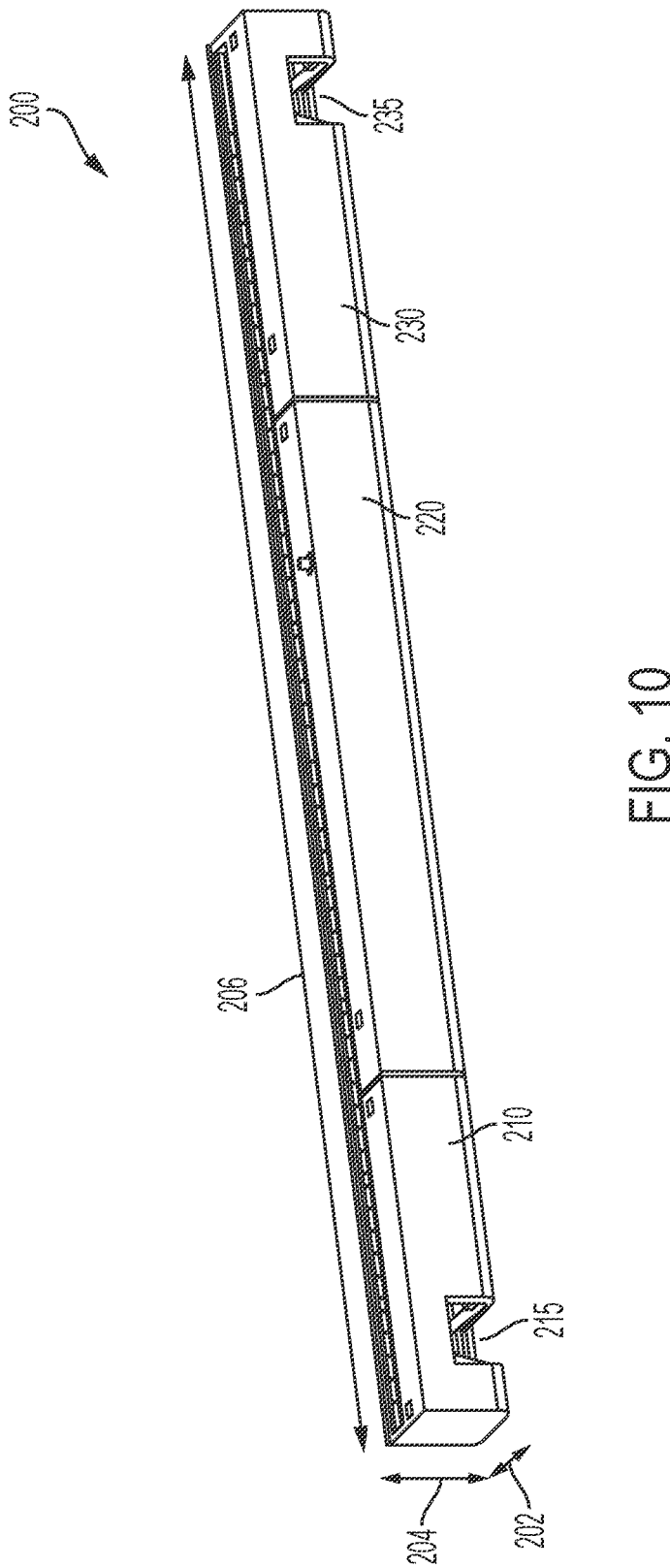
FIG. 10 is a perspective view of an x-beam assembly according to a non-limiting embodiment of the present disclosure.

Referring to FIG. 10, the x-beam assembly 200 may include a plurality of x-beam sections/modules 210, 220, 230. A first x-beam section 210 and a last x-beam section 230, each may include a tower groove 215, 235 configured to be engaged with the x-beam interface 190 of respective tower assembly 100. The x-beam assembly 200 may include one or more intermediate x-beam sections 220 between the first x-beam section 210 and the last x-beam section 230.

In some embodiments, the x-beam assembly 200 may have a length 206 in a range of about 30 feet to about 40 feet. In other embodiments, the x-beam assembly 200 may have any other suitable length. In some embodiments, the x-beam assembly 200 may have a width 202 in a range of about 20 inches to about 40 inches. In other embodiments, the x-beam assembly 200 may have any other suitable width. In some embodiments, the x-beam assembly 200 may have a height 204 in a range of about 20 inches to about 40 inches. In other embodiments, the x-beam assembly 200 may have any other suitable height. In some embodiments, the 3D printing system 10 may be able to adjust the distance between the pair of the tower assemblies 100 by adjusting the length of the x-beam assembly 200 (e.g., by adjusting the number/ length of the intermediate x-beam section(s) 220).

Figure 11:
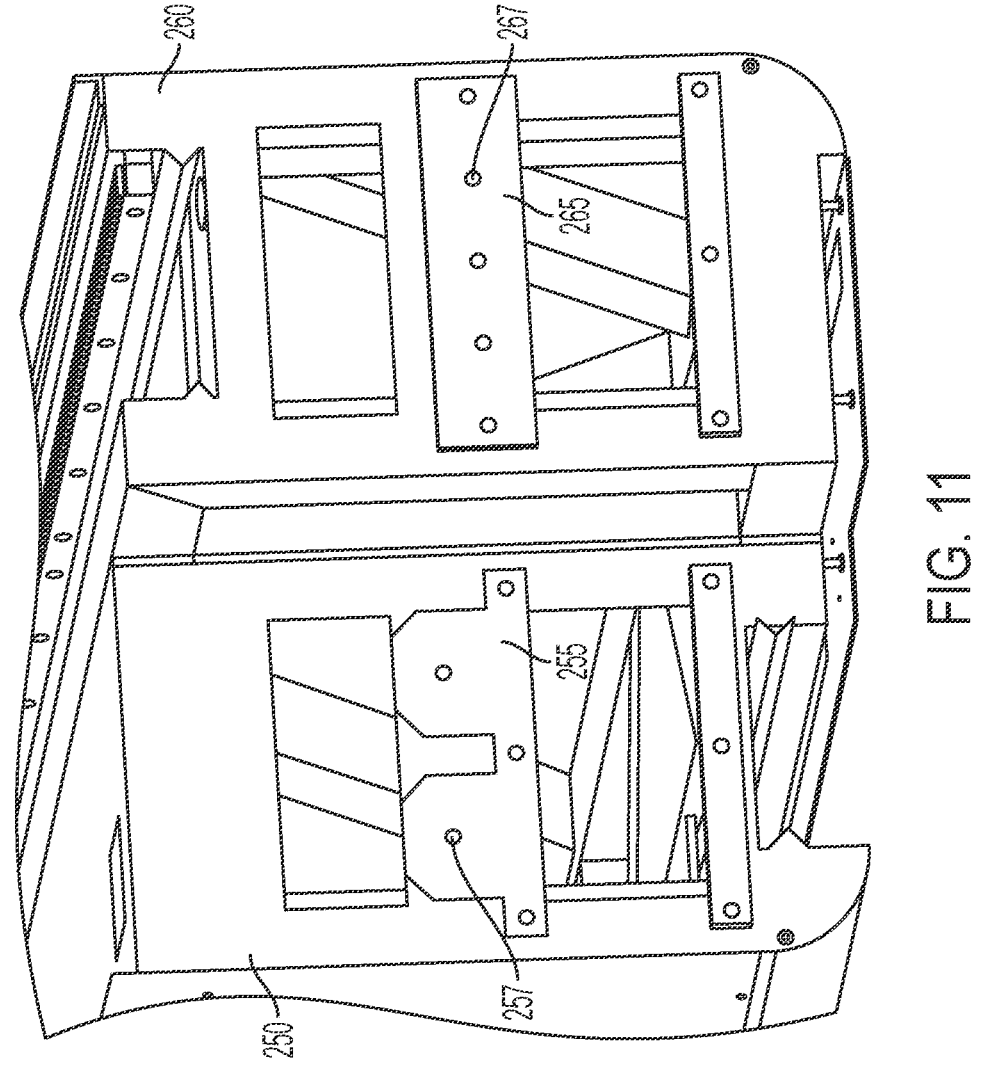
FIG. 11 is a perspective side view of x-beam sections according to a non-limiting embodiment of the present disclosure.
Figure 12:
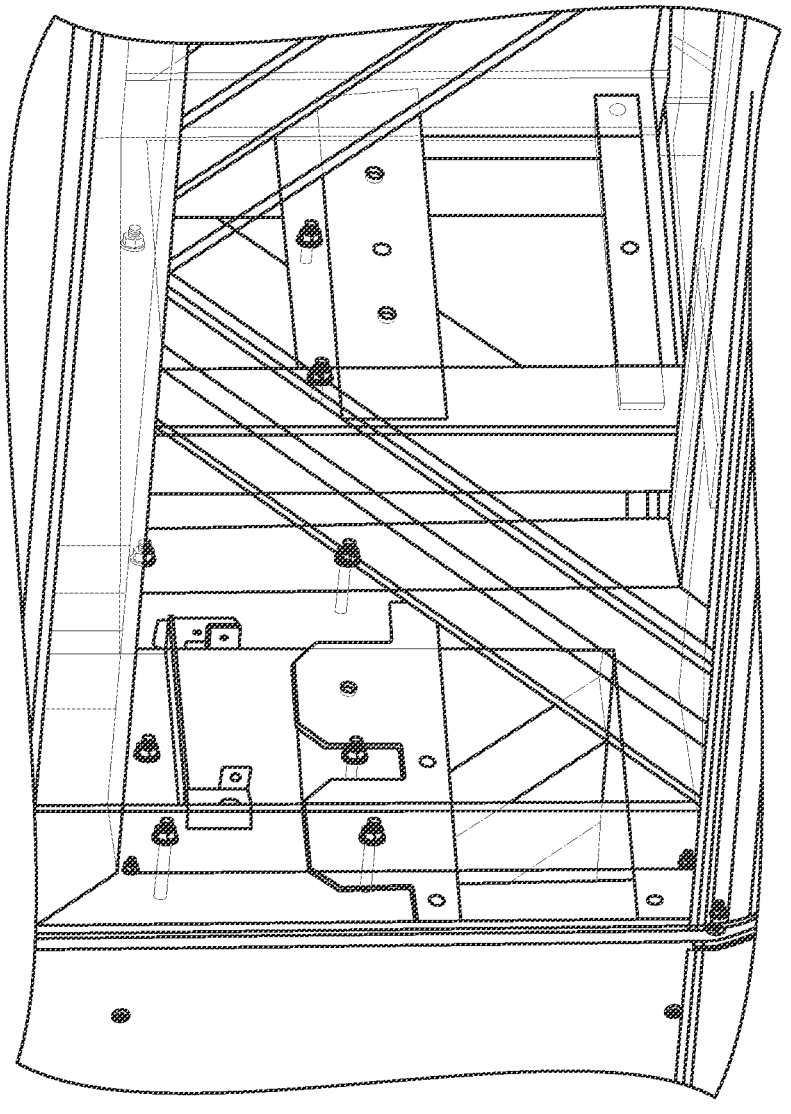
FIG. 12 illustrates a partially transparent view of the x-beam sections of FIG. 10, where the x-beam sections are arranged to be mated with each other.
Figure 13:
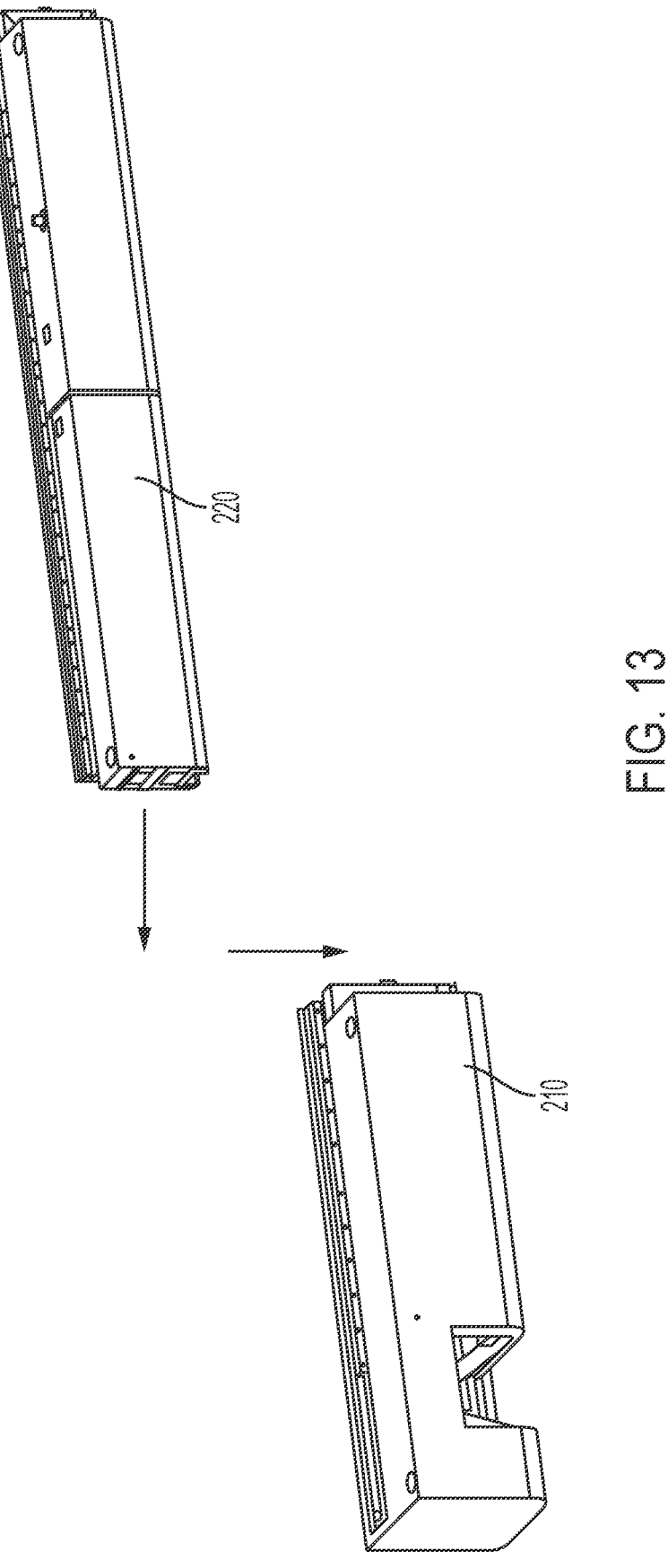
FIG. 13 illustrates an example way of engaging an x-beam section with another x-beam section according to a non-limiting embodiment of the present disclosure.

The plurality of x-beam sections 210, 220, 230 may be releasably interlocked with an adjacent x-beam section via any suitable manner. For example, as illustrated in FIGS. 11 and 12, each x-beam section may include a male component 255 on a first surface 250 that interfaces a first adjacent x-beam section and/or a female component 265 on a second surface 260 that interfaces a second adjacent x-beam section. As illustrated in FIGS. 12 and 13, the male component 255 may slide into the female component 265. Some fastener holes 257, 267 may be also provided on the male and female components 255, 265 to secure the male component 255 of one x-beam section with the female component 265 of the adjacent x-beam section through a fastener. The first and last x-beam sections 210, 230 may include only one of the male and female components since they may interface with only one adjacent x-beam section (e.g., intermediate x-beam section 220). The x-beam sections may include a space for a hose, electrical lines, and/or pneumatic lines (e.g., the hose, electrical lines, and/or pneumatic lines from the drag chain).

Figure 14:
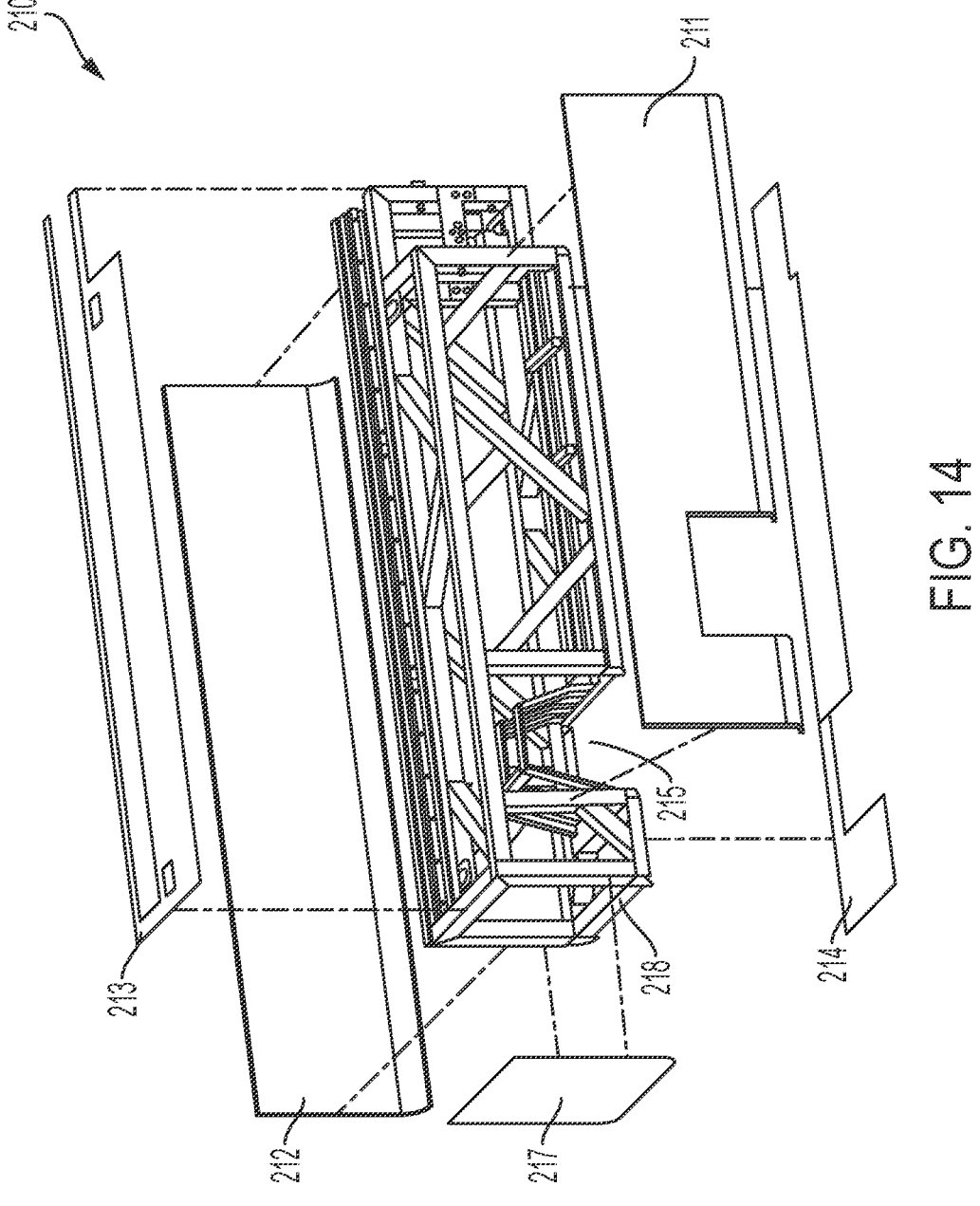
FIG. 14 is a perspective exploded view of an x-beam section according to a non-limiting embodiment of the present disclosure.

The x-beam assembly 200 may consist of removable panels and truss frames inside the removable panels. FIG. 14 shows the first x-beam section 210 as an example of having such structure. As shown in FIG. 14, the x-beam assembly 200 may consist of removable panels 211, 212, 213, 214, 217 and truss frames 218 inside the removable panels. The removable panels may include a front removable panel 211, a rear removable panel 212, a top removable panel 213, a bottom removable panel 214, and a side removable panel 217. In some embodiments, all or some of the removable panels may include a sensor configured to detect collisions or provide an alert about an object in front of the respective panel. For example, the front removable panel 211, the rear removable panel 212, and/or the bottom removable panel 214 may include a sensor for detecting collisions or objects in front of the respective panel. In some embodiments, when a collision is detected by the sensor, the 3D printing system 10 may stop the printing operation and/or the entire system. Examples of the collision sensors may include a pressure sensor, an infrared sensor, an ultrasonic sensor, and an optical sensor.

In some embodiments, when the x-beam assembly 200 is moving forward and an object is detected within a predetermined distance in front of the front removable panel 211, the 3D printing system 10 may stop the printing operation, movement of the tower assembly/shuttle assembly, and/or the entire system. In some embodiments, when the x-beam assembly 200 is moving backward and an object is detected within a predetermined distance in front of the rear removable panel 212, the 3D printing system 10 may stop the printing operation, movement of the tower assembly/shuttle assembly, and/or the entire system. In some embodiments, when the x-beam assembly 200 is moving downward and an object is detected within a predetermined distance in front of the bottom removable panel 214, the 3D printing system 10 may stop the printing operation, movement of the tower assembly/shuttle assembly, and/or the entire system.

Although the structure of the x-beam assembly 200 is described by using the first x-beam section 210 as an example, the structure/functions of other x-beam sections of the x-beam assembly 200 (e.g., panels, truss frames, sensors) may be similar to and/or same as the first x-beam section 210 and, thus, duplicate description of other x-beam sections may be omitted.

Figure 15:
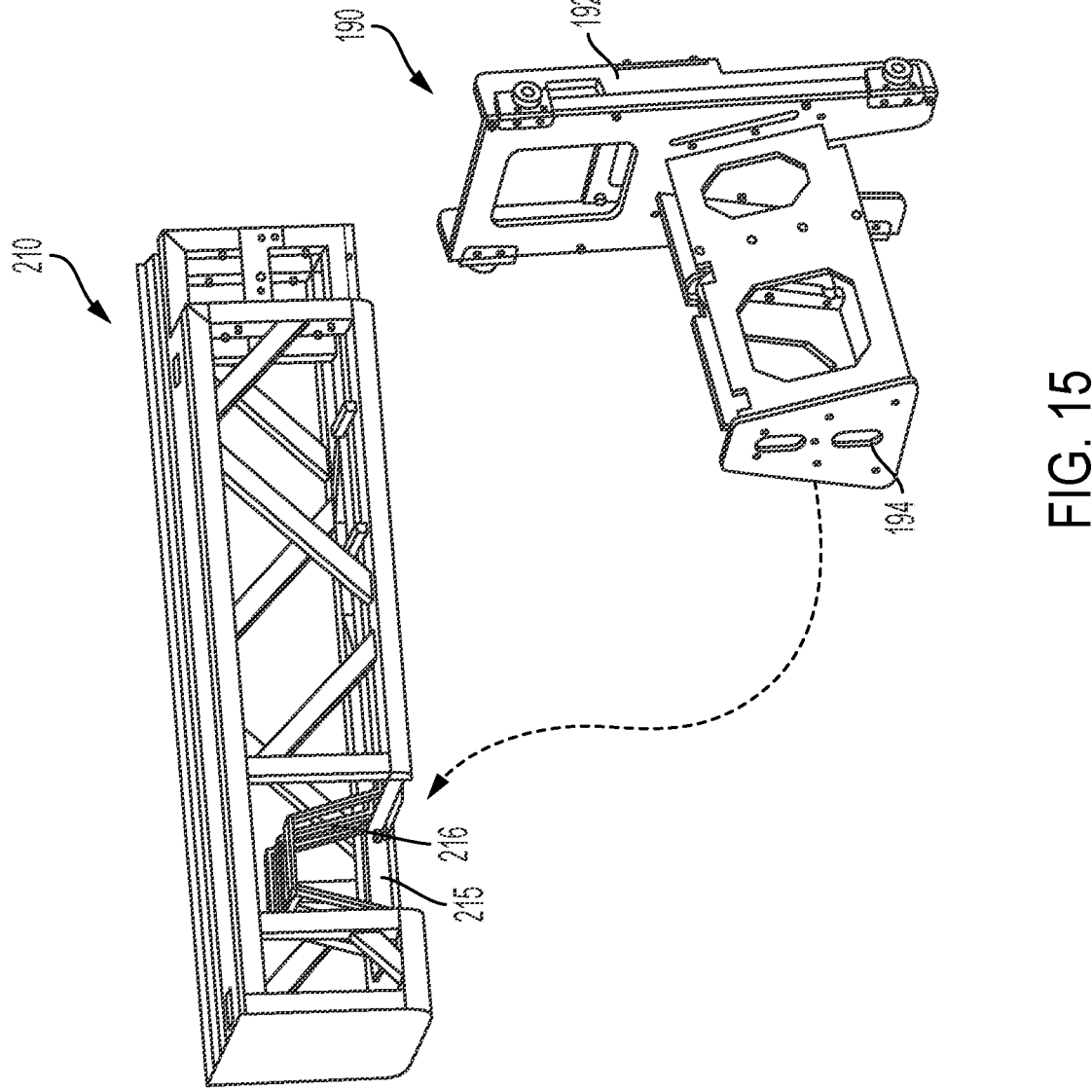
FIG. 15 is a perspective view of an x-beam section and an x-beam interface according to a non-limiting embodiment of the present disclosure.
Figure 16:
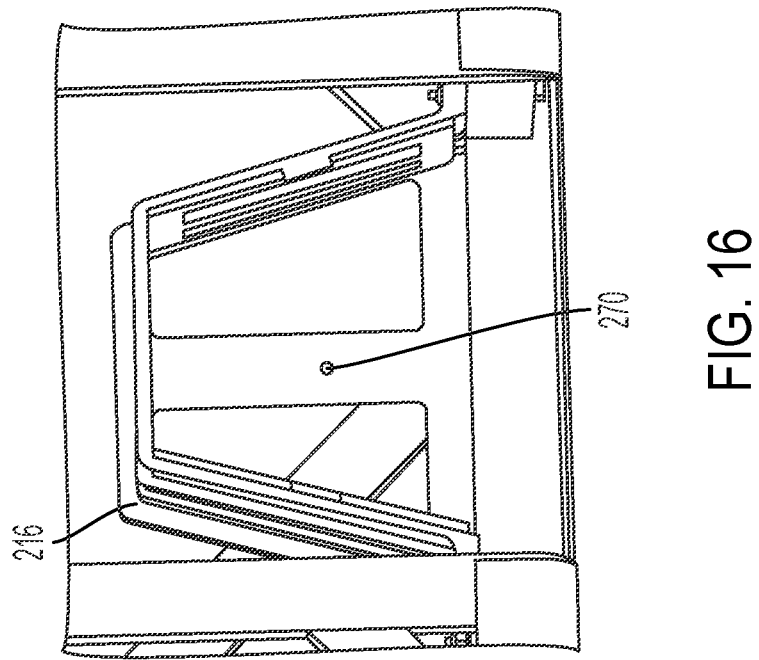
FIG. 16 is a front view of a tower acceptor of the x-beam section of FIGS. 14 and/or 15.
Figure 17:
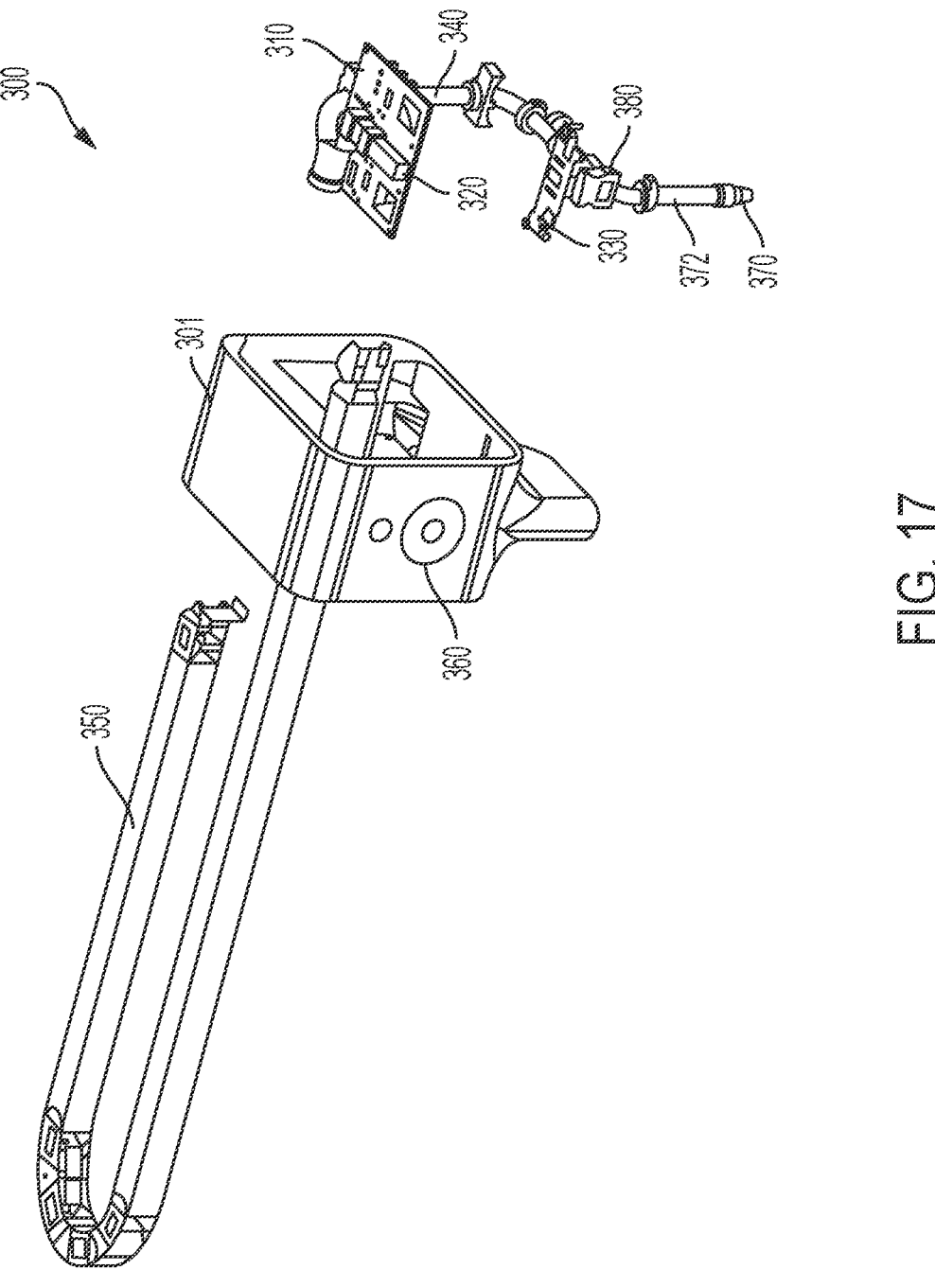
FIG. 17 is a perspective exploded view of a shuttle according to a non-limiting embodiment of the present disclosure.

As illustrated in FIG. 15, the first x-beam section 210 may include a tower acceptor 216 that defines the tower groove 215. The x-beam interface 190 of the tower assembly 100 may include a movable base plate 192 and a protrusion 194. The protrusion 194 of the x-beam interface 190 may be configured to be engaged and mated with the tower acceptor 216 within the tower groove 215. When the x-beam assembly 200 is mated/engaged with the tower assemblies 100 (through the tower acceptor 216 and x-beam interface 190), the x-beam assembly 200 may traverse up and down as the x-beam interface 190 (e.g., the base plate 192) traverses up and down. In some embodiments, when the protrusion 194 is inserted into the tower acceptor 216, the first x-beam section 210 (and ultimately the x-beam assembly 200) may hang on the protrusion 194. In some embodiments, the tower acceptor 216 and the protrusion 194 may have a wedge structure. The tower acceptor 216 and the protrusion 194 may be mated/engaged by using only one single fastener (e.g., pin, bolt, etc.). For example, as illustrated in FIG. 16, the tower acceptor 216 may include a fastener hole 270, which can be secured with another fastener hole on the protrusion 194 through a single fastener. In other embodiments, the tower acceptor 216 and the protrusion 194 may have any other suitable structure and mated/engaged with each other in any other suitable manner. The structure/ functions of the last x-beam section 230 (e.g., tower groove, tower acceptor, wedge structure) may be similar to and/or same as the first x-beam section 210 and, thus, duplicate description of the last x-beam section 230 may be omitted.

Referring to FIGS. 17-20, the shuttle assembly 300 may include a main body 301, a shuttle driver 310, a shuttle motor 320 in the shuttle driver 310, an idler assembly 330, an outflow assembly 340, and a shuttle drag chain 350. In some embodiments, the main body 301 may include a system status indicator 360, which will be discussed in detail below. The shuttle driver 310 (and the shutter motor 320) may be configured to drive the shuttle assembly 300 back and forth along the x-beam assembly 200 (and along the x-axis 20). The shuttle drag chain 350 may include a hose, electrical lines (e.g., cable lines), and/or pneumatic lines. The hose may be used to deliver an extrudable building material to the outflow assembly 340. The electrical lines may include power cables and/or other cables for data communication.

Figure 20:
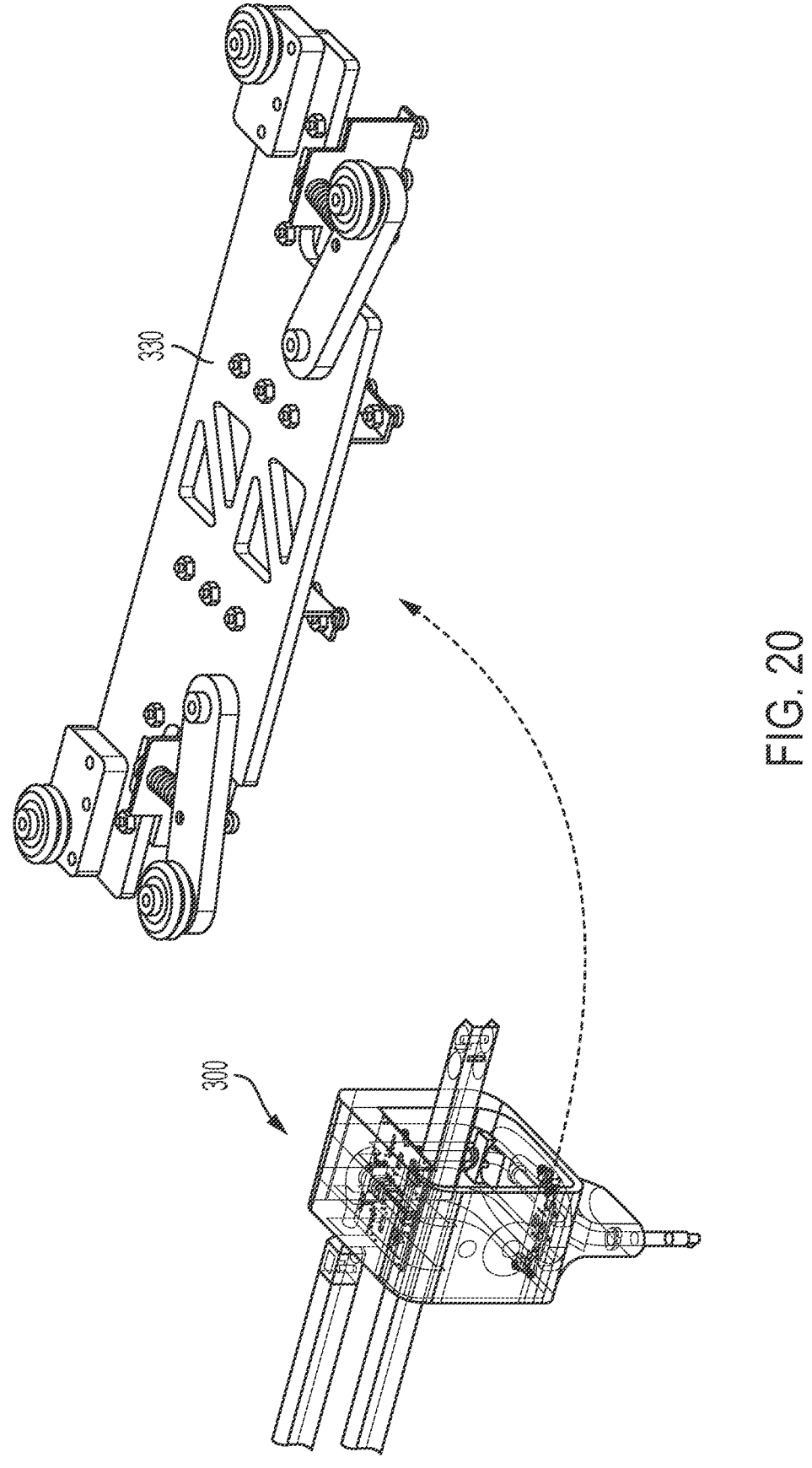
FIG. 20 is a partially transparent view of the shuttle of FIG. 17 and an expanded view of an idler assembly in the shuttle of FIG. 17.

The idler assembly 330 may include roller bearings. For example, as shown in FIG. 20, the idler assembly 300 may include four pairs of (v-groove) roller bearings. The idler assembly 330 may be configured to position the shuttle assembly 300 along tracks where it can be contained and mobilized in a linear fashion. Each pair of outboard roller bearings may be spring loaded to provide constant force to ensure proper contact with the tracks (e.g., 90 degree angle tracks).

The outflow assembly 340 may include a nozzle 370, a valve 372, and a mounting component 380. The outflow assembly 340 may be configured to deliver an extrudable building material (e.g., a cement mixture) to the target place through the nozzle 370 so that it may be deposited onto the target place during construction operations. For example, during operations, extrudable building material may be provided to the outflow assembly 340 from a supply source via a supply conduit (e.g., the hose in the drag chain 165 and the shuttle drag chain 350) that is placed on/within the x-beam assembly 200. The supply source and the supply conduit connected to the outflow assembly 340 on the shuttle assembly 300 are not shown for simplicity. The supply source may comprise any suitable tank, hopper, vessel, etc. that is configured to contain a volume of extrudable building material therein. For example, in some embodiments, the source may comprise a tank, a cement mixer (e.g., such as that found on a stand-alone cement mixer or on a cement truck), or other suitable container, and may be disposed immediately adjacent the 3D printing system 10, or may be relatively remote from the 3D printing system 10. The outflow assembly 340 and the supply conduit may comprise a hose, pipe or any other suitable conduits or channels for delivering the extrudable building material from the source (e.g., open channels, tubing, etc.).

The valve 372 may be an actuatable member that is configured to selectively close off or adjust the flow of extrudable building material to the nozzle 370 during operations. In some embodiments, the valve 372 may comprise a pinch valve; however, other valve designs or arrangement may be used in other embodiments (e.g., ball valve, gate valve, butterfly valve, etc.). The valve 372 may be actuated between a fully open position, where valve 372 has little to no effect on the flow rate of building material flowing to the nozzle 370, and a fully closed position, where the valve 372 prevents all extrudable building material from progressing to the nozzle 370 from the supply conduit. In addition, the valve 372 may also be actuated to a plurality of positions that are between the fully open and fully closed positions to progressively adjust the flow of building material to the nozzle 370. In some embodiments, the valve 372 may be pneumatically actuated with compressed air; however, other actuation methods are possible, such as, for example, electrical actuation, hydraulic actuation, mechanical actuation, or some combination thereof.

During a construction operation, the shuttle assembly 300 may be traversed along axes 20, 30, 40 about the target place via the tower assemblies 100, x-beam assembly 200, and rail assemblies 400. Simultaneously, the shuttle assembly 300 may be actuated (e.g., via the valve 372 and/or a pump) to extrude or deposit building material (e.g., a cement mixture) on the target place. In particular, during these operations, the shuttle assembly 300 may be traversed along the y-axis 30 via actuation of the Y-axis drive system 180 in the tower assemblies 100 and the engagement between the gear 185 and the gear rack 450 on the rail assemblies 400. In addition, the shuttle assembly 300 may be traversed along x-axis 20 via actuation of the shuttle driver 310 and the engagement between the shuttle drag chain 350 on the x-beam assembly 200 and the shuttle motor 320. Further, the shuttle assembly 300 may be traversed along the z-axis 40 via actuation of the gear box/z-axis drive system 130 and the engagement between the respective x-beam interface 190 in each tower assembly 100 and the respective tower acceptor 216 in the x-beam assembly 200. Thus, the selective actuation of the Y-axis drive system 180 and the shuttle driver 310 may cause the shuttle assembly 300 to be controllably maneuvered within a plane that is parallel to target place and the selective actuation of the gear box/z-axis drive system 130 may cause the shuttle assembly 300 to be controllably translated vertically (or along z-axis 40).

The above-described actuation of the Y-axis drive system 180, shuttle driver 310, and gear box/z-axis drive system 130 may be monitored and controlled by a central controller (e.g., control system 140). The central controller may comprise any suitable device or assembly that is capable of receiving an electrical or informational signal and transmitting various electrical, mechanical, or informational signals to other devices (e.g., valve 372, pump, etc.). In particular, the central controller may include a processor and a memory. The processor (e.g., microprocessor, central processing unit, or collection of such processor devices, etc.) may execute machine readable instructions provided on the memory to provide the processor with all of the functionality described herein. The memory may comprise volatile storage (e.g., random access memory), non-volatile storage (e.g., flash storage, read only memory, etc.), or combinations of both volatile and non-volatile storage. Data consumed or produced by the machine readable instructions can also be stored on the memory. A suitable power source may also be included within or coupled to the central controller to provide electrical power to the components within the controller (e.g., processor, memory, etc.). The power source may comprise any suitable source of electrical power such as, for example, a battery, capacitor, a converter or a local power grid, etc.

The central controller may be coupled to each of the Y-axis drive system 180, shuttle driver 310, and gear box/z-axis drive system 130 via a plurality of communication paths. The communication paths may comprise any suitable wired (e.g., conductive wires, fiber optic cables, etc.) or wireless connection (e.g., WIFI, BLUETOOTH®, near field communication, radio frequency communication, infrared communication, etc.). The central controller may be also coupled to a pump via a conductive path. The pump may be fluidly coupled between the shuttle assembly 300 and a supply source (e.g., supply tank or vessel) that holds or retains a volume of extrudable building material therein. The pump may be configured to induce a flow of the extrudable building material from the supply source to the shuttle assembly 300 via a supply conduit (e.g., drag chain 165) and outflow assembly 340.

During operations, the central controller may selectively actuate the Y-axis drive system 180, shuttle driver 310, and gear box/z-axis drive system 130 to controllably maneuver the shuttle assembly 300 along each of the axes 20, 30, 40, as described above. In addition, the central controller may also actuate the pump to controllably flow extrudable building material from a supply source to the nozzle 370 of the outflow assembly 340. Specifically the central controller may selectively maneuver the shuttle assembly 300 along axes 20, 30, 40 and emit building material from the nozzle 370 per machine readable instructions (e.g., software) that are stored on a memory and executed by a processor.

The central controller may be also coupled to the valve 372 via a communication path and configured to actuate the valve 372 between the fully open position, the fully closed position, and to the plurality of positions that are between the fully open and fully closed positions to progressively adjust the flow of building material emitted from the nozzle 370. During operations, the central controller may actuate the valve 372 (e.g., via a compressed air or other actuation system) to a desired position. In some embodiments, the central controller may be configured to actuate the valve 372 based on a number of factors, such as, for example, the operating status of the pump, the portion of the building structure that is to be constructed/printed, the length of supply conduit between the pump and the valve 372, and so on.

During construction operations, extrudable building material (e.g., a cement mixture) may be mixed and provided to the shuttle assembly 300. In some embodiments, the extrudable building material may be delivered pre-mixed to the construction site and provided (e.g., pumped) to the shuttle assembly 300. In other embodiments, the extrudable building material may be mixed at the construction site and provided to the shuttle assembly 300 either continuously or in batches to facilitate the construction of structures. In some embodiments, a material delivery system may be provided for mixing and delivering extrudable building material to the shuttle assembly 300 during operations.

Figure 18:
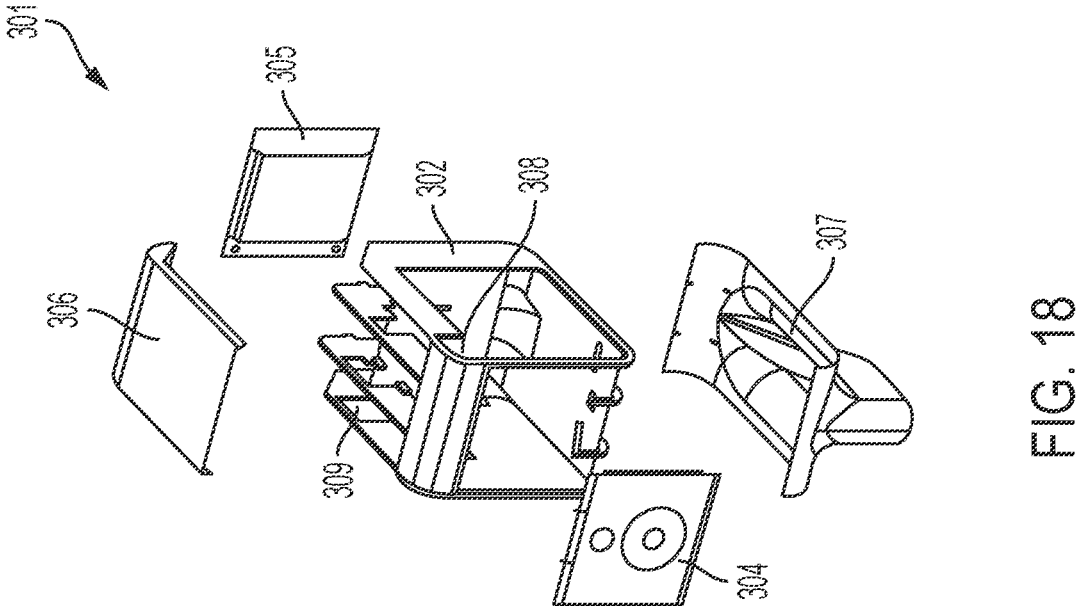
FIG. 18 is a perspective exploded view of a main body of the shuttle of FIG. 17.
Figure 19:
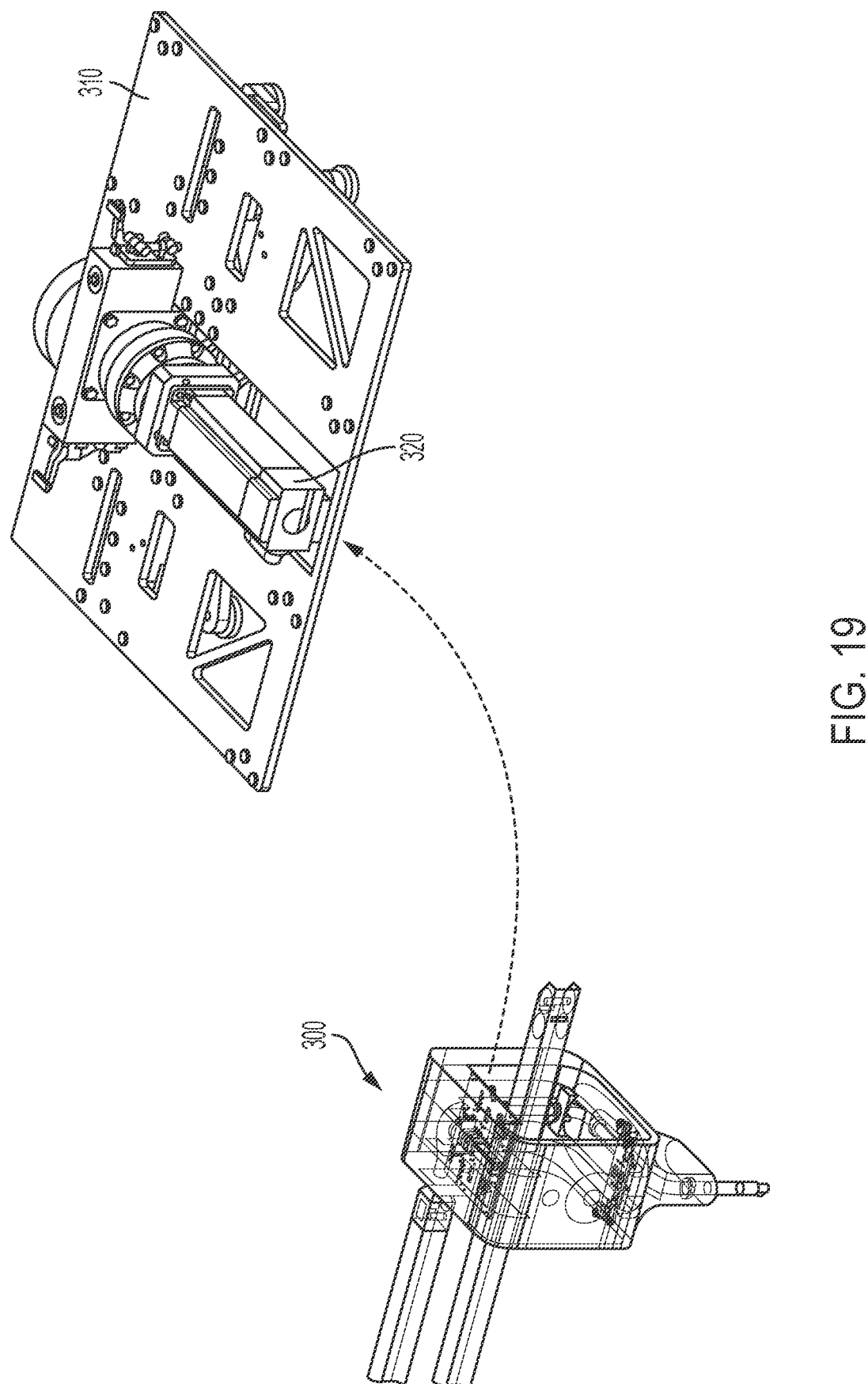
FIG. 19 is a partially transparent view of the shuttle of FIG. 17 and an expanded view of a shuttle driver and a shuttle motor in the shuttle of FIG. 17.

The shuttle driver 310, the shuttle motor 320, the idler assembly 330, and the outflow assembly 340 may be placed within the main body 301, as shown in FIGS. 19 and 20. Referring to FIG. 18, the main body 301 may include a main frame 302, a front panel 304, a rear panel 305, a top panel 306, and a bottom shroud 307. In some embodiments, the main frame 302 may include one or more channels configured to accept the shuttle drag chain 350. For example, the main frame 302 may include a first channel 308 in the upper front side and a second channel 309 in the upper rear side.

In some embodiments, at least one of the front panel 304, the rear panel 305, the top panel 306, and the bottom shroud 307 may include a sensor configured to detect collisions or provide an alert about an object in front of the respective panel/shroud. For example, the front panel 304, the rear panel 305, and/or the bottom shroud 307 may include a sensor for detecting collisions or objects within a predetermined distance in front of the respective panel/shroud. In some embodiments, when a collision is detected by the sensor or when an object is detected within a predetermined distance from the respective panel/shroud, the 3D printing system 10 may stop the printing operation and/or the entire system. Examples of the collision sensors may include a pressure sensor, an infrared sensor, an ultrasonic sensor, and an optical sensor. As shown in FIGS. 18-20, the bottom shroud 307 may include a hole through which the outflow assembly 340 extends out from a bottom end of the bottom shroud 307 in a downward direction to expose the nozzle 370. In some embodiments, the nozzle 370 may be hidden inside the bottom shroud 307. The mounting component 380 may be configured to mount the outflow assembly 340 on the bottom shroud 307.

Figures 21, 22:
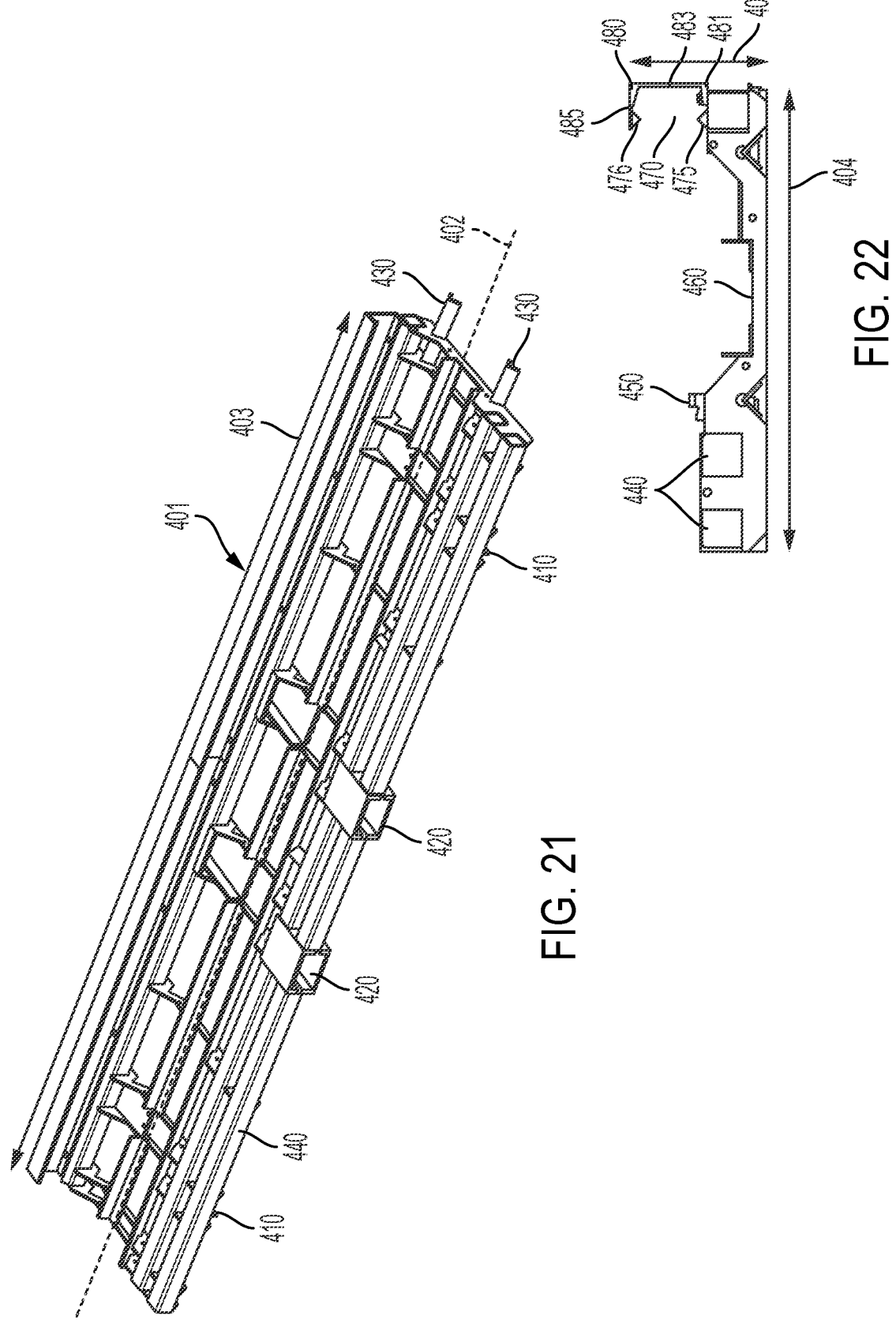
FIG. 21 is a perspective view of a rail part of a rail assembly according to a non-limiting embodiment of the present disclosure.
FIG. 22 is a side view of the rail part of FIG. 21.
Figure 23:
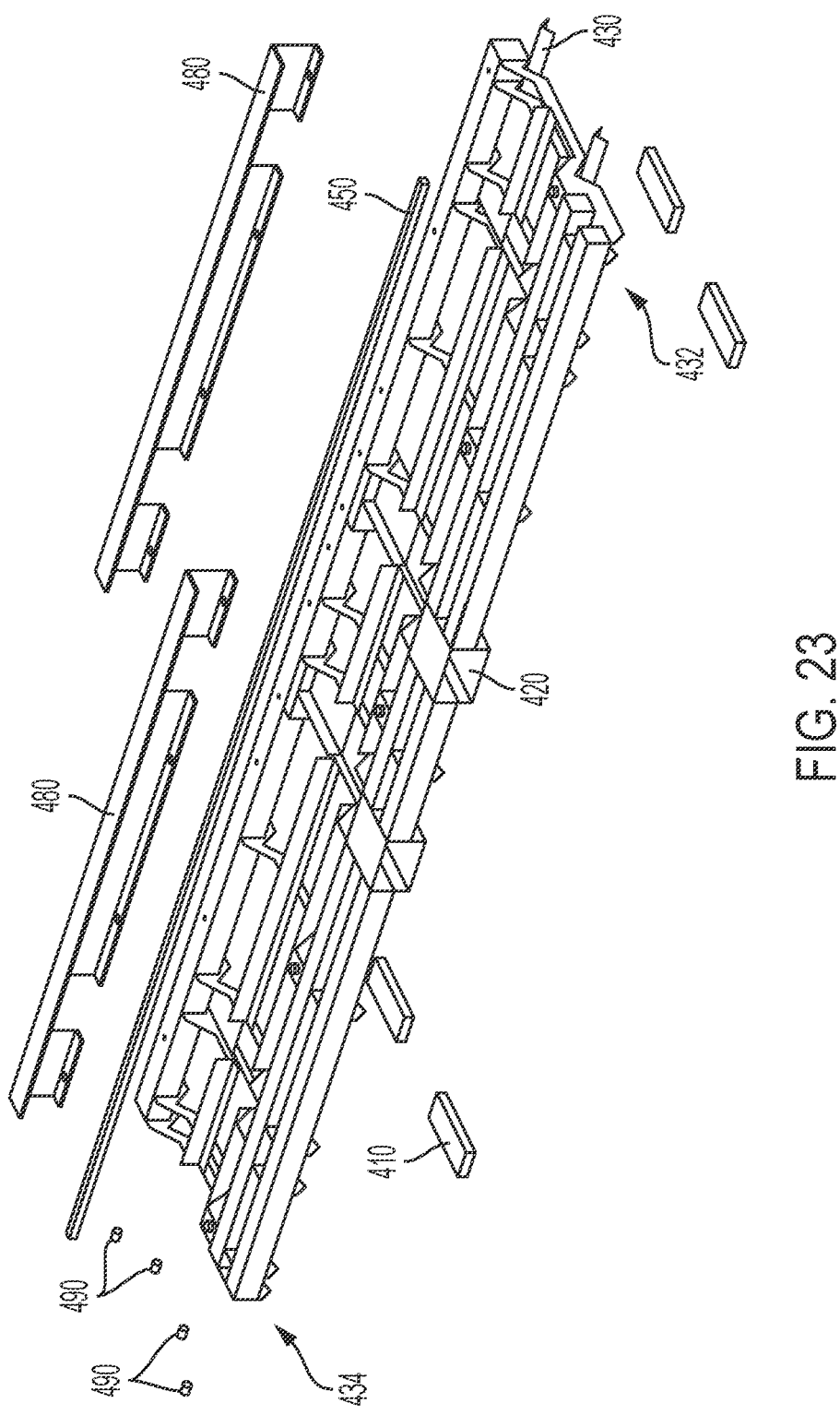
FIG. 23 is a perspective exploded view of the rail part of FIG. 21.
Figure 24:
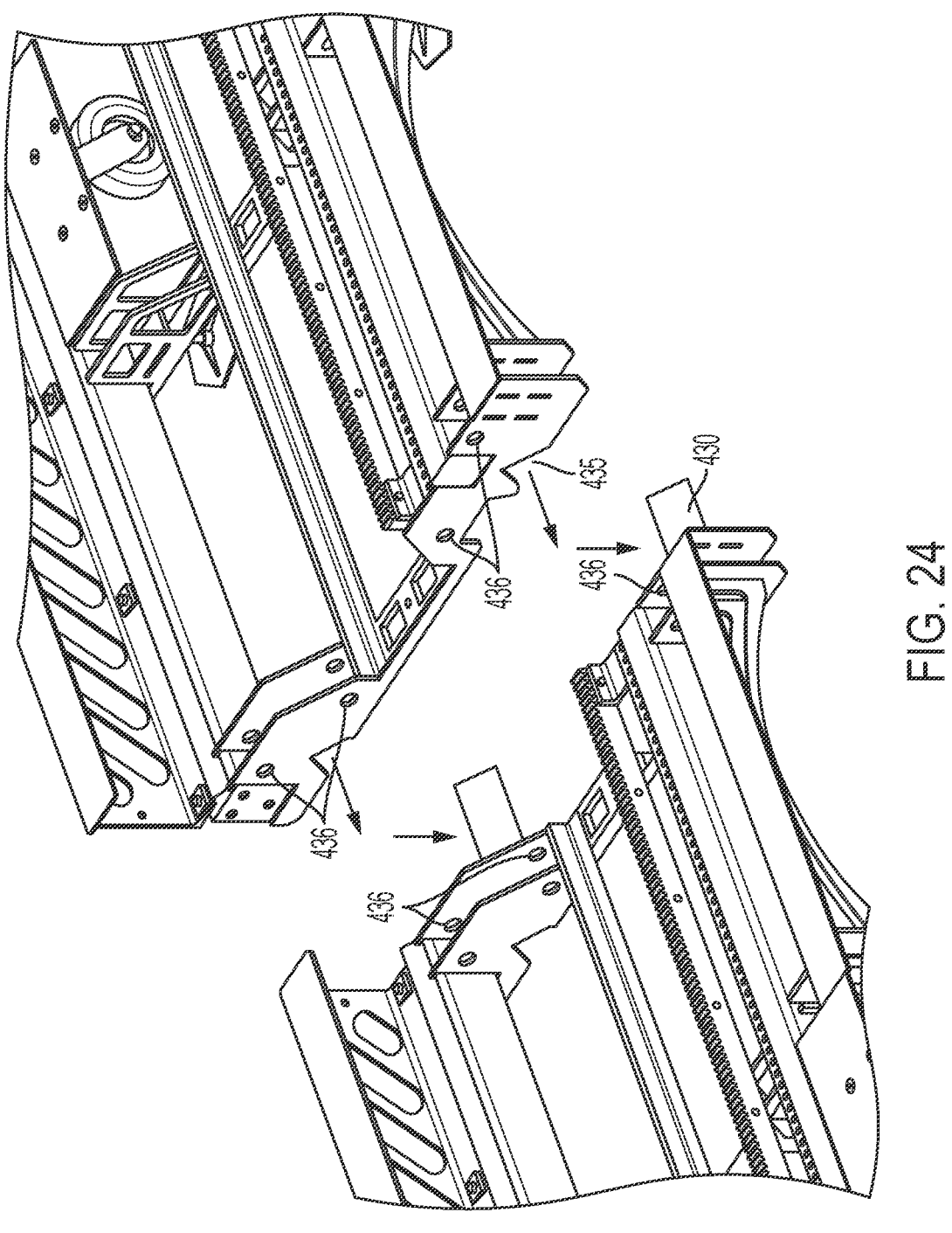
FIG. 24 is a perspective view of two rail parts before alignment.

In some embodiments, the rail assembly 400 may include a plurality of rail parts/modules. FIGS. 21-23 illustrate an example rail part 401 according to an example of the present disclosure. As shown in FIGS. 21-23, the rail part 401 may define a longitudinal axis 402. The longitudinal axis 402 may be parallel to the y-axis 30. The rail part 401 may include one or more tracks 440, 460, 470 extending along the longitudinal axis 402. The tracks 440 and 470 may be configured to accept rollers (e.g., rollers 170, 172, 174) of the tower assemblies 100. For example, the tracks 440 may be configured to accept rollers (e.g., rollers 172, 174) of the tower assemblies 100. The track 470 may be configured to accept the rollers (rollers 170) of the tower assemblies 100. As shown in FIG. 22, a side cover 480 may be provided to the track 470 and the side cover 480 may include a bottom surface portion 481, a vertical side portion 483, and a top surface portion 485.

In some embodiments, as shown in FIG. 22, a first elongate protrusion 475 may be formed near/at the bottom surface portion 481 of the side cover 480, and a second elongate protrusion 476 may be formed above the first elongate protrusion 475 near/at the top surface portion 485 of the side cover 480. The elongate protrusions 475, 476 and the side cover 480 together may form the track 470. The track 460 may be a drag chain track configured to accept the drag chain 165 of the tower assemblies 100.

In some embodiments, the rail part 401 may further include a gear rack 450 extending along the longitudinal axis 402. The gear rack 450 may be configured to be mated with the gear 185 of the tower assemblies 100. The rail part 401 may also include a level adjustment jack 410 configured to support the rail part 401 and adjust a distance between the rail part 401 and the ground, and one or more forklifting holes 420 at a side portion thereof.

In some embodiments, the rail part 401 may have a length 403 in a range of about 10 feet to about 30 feet. In other embodiments, the rail part 401 may have any other suitable length. In some embodiments, the rail part 401 may have a width 404 in a range of about 30 inches to about 60 inches. In other embodiments, the rail part 401 may have any other suitable width. In some embodiments, the rail part 401 may have a height 406 in a range of about 5 inches to about 30 inches. In other embodiments, the rail part 401 may have any other suitable height.

In some embodiments, as shown in FIGS. 21-24, the rail part 401 may further include one or more aligning protrusions 430 at a first end portion 432 and one or more aligning grooves 435 at a second end portion 434. In some embodiments, the aligning protrusions 430 and the aligning grooves 435 may be formed at a bottom portion of the rail part. In other embodiments, the aligning protrusions 430 and the aligning grooves 435 may be formed at any other suitable portion (e.g., middle/top portion) of the rail part.

Figure 25:
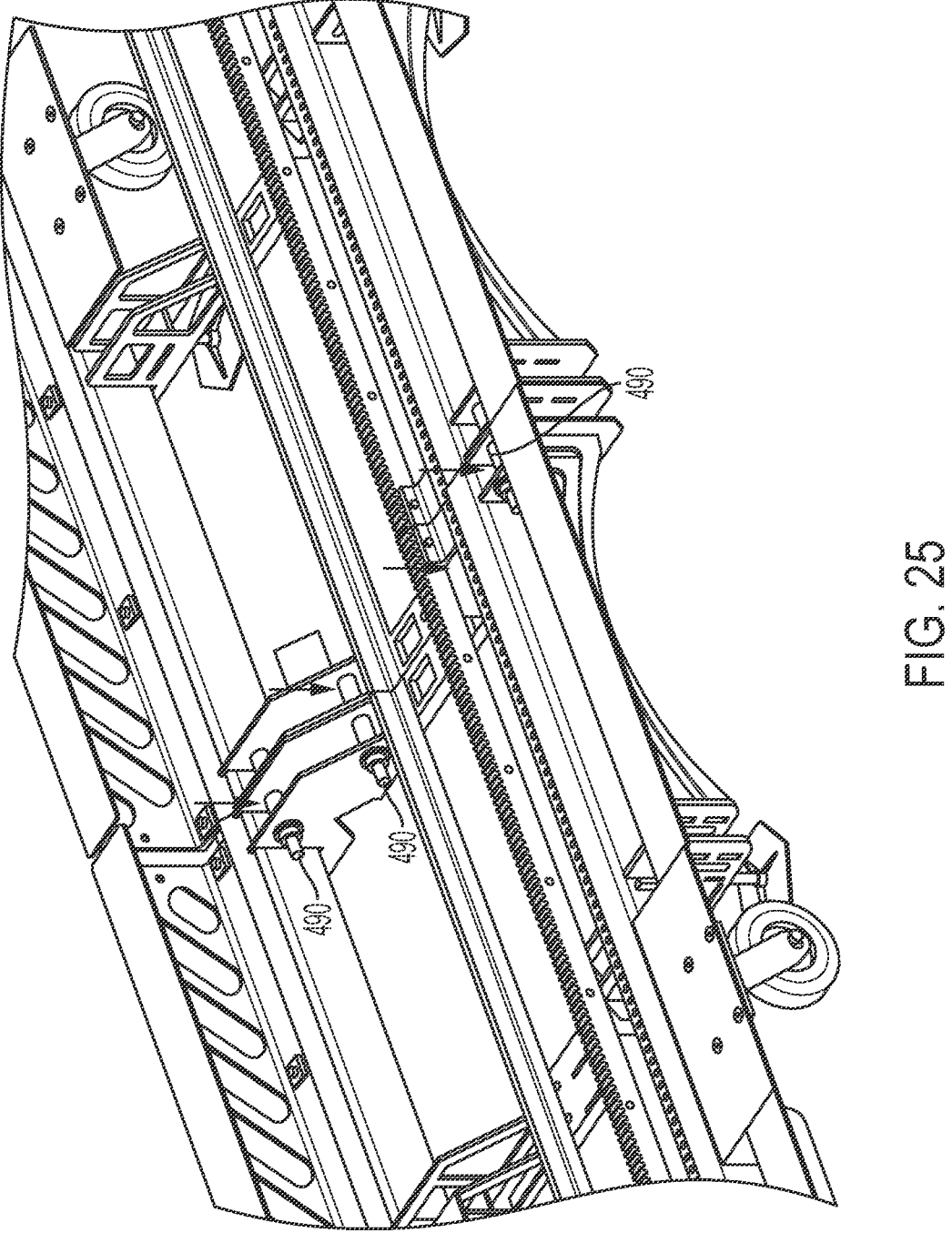
FIG. 25 is a perspective view of two rail parts after alignment.

The aligning grooves 435 of one rail part may be configured to be engaged with the aligning protrusions 430 of an adjacent rail part. For example, the aligning grooves 435 of one rail part may slide over the aligning protrusions 430 of an adjacent rail part. In some embodiments, the rail part 401 may further include fastener holes 436 at the first and second end portions 432, 434. The fastener holes 436 of one rail part may be secured with the fastener holes of an adjacent rail part through a fastener 490 (e.g. pin, bolt, etc.), as shown in FIG. 25. For example, after a first rail part is aligned with an adjacent second rail part through the aligning protrusions 430 of the first rail part and the aligning grooves 435 of the adjacent second rail part, the fastener holes 436 at one end portion 432 of the first rail part and the fastener holes 436 at one end portion 434 of the adjacent rail part are secured through the fasteners 490.

Figure 26:
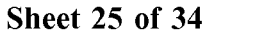
FIG. 26 is a perspective view of a rail part of a rail assembly with rollers and level adjustment jacks according to a non-limiting embodiment of the present disclosure.
Figures 27A, 27B:
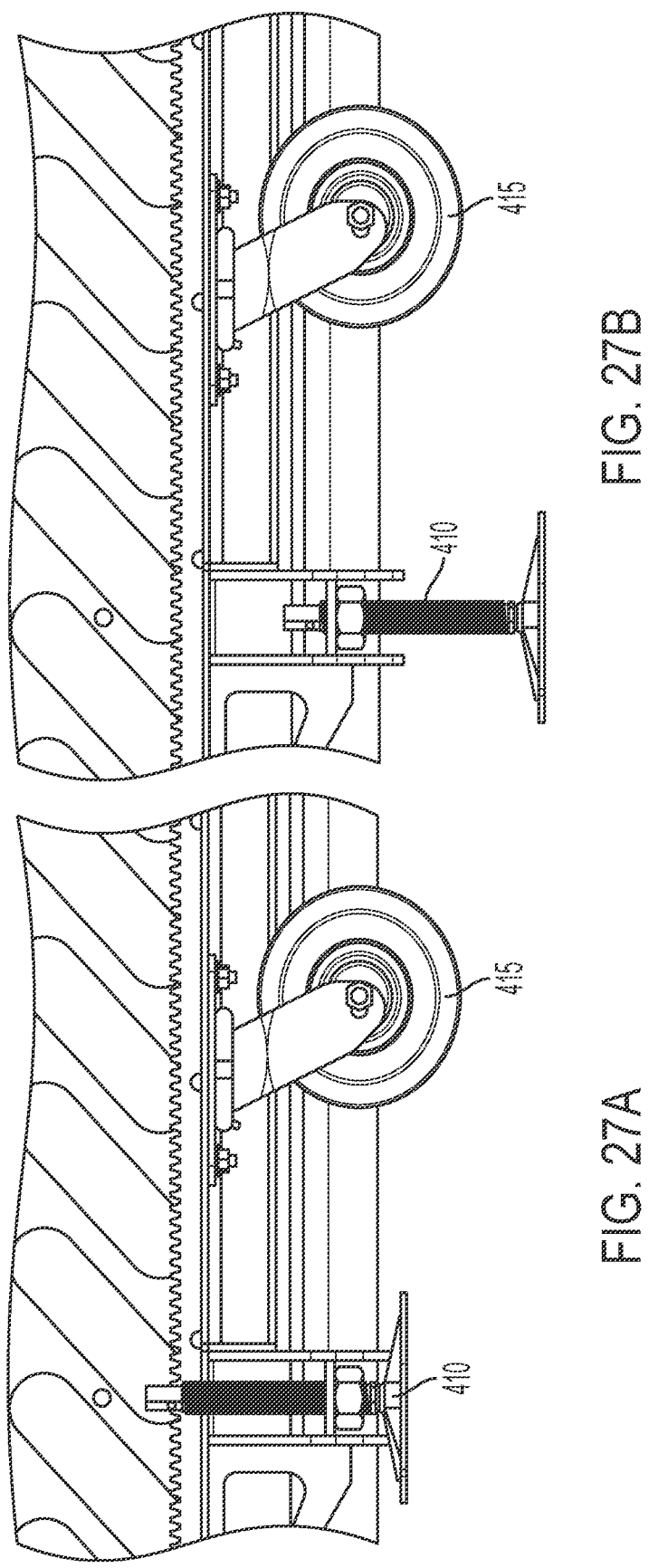
FIG. 27(*a*) is an expanded side view of the rail part of FIG. 26 with the level adjustment jack raised.
Figure 28:
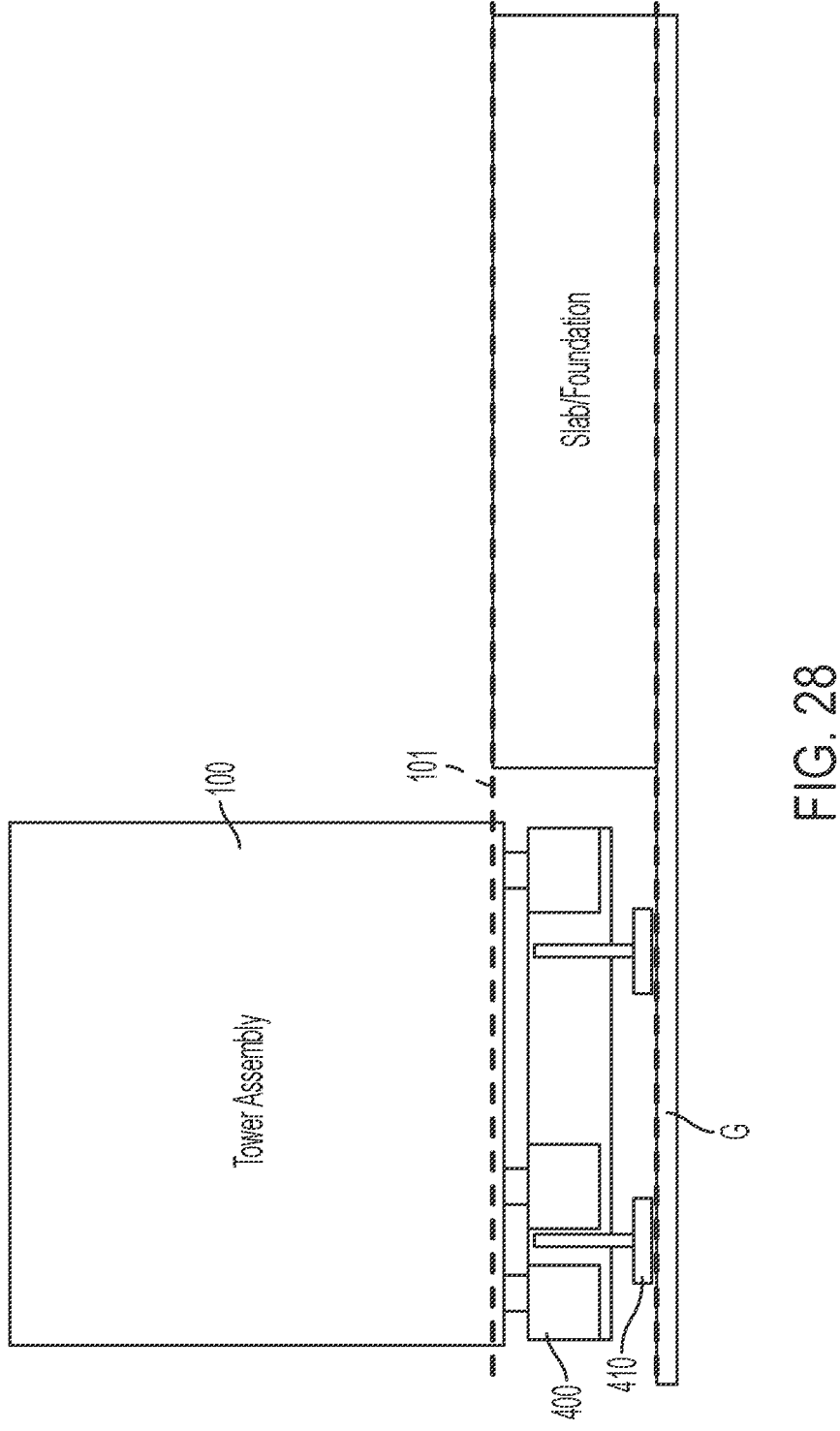
FIG. 28 is a partial side view of a tower assembly and a rail assembly arranged next to a slab/foundation according to a non-limiting embodiment of the present disclosure.
Figure 29:
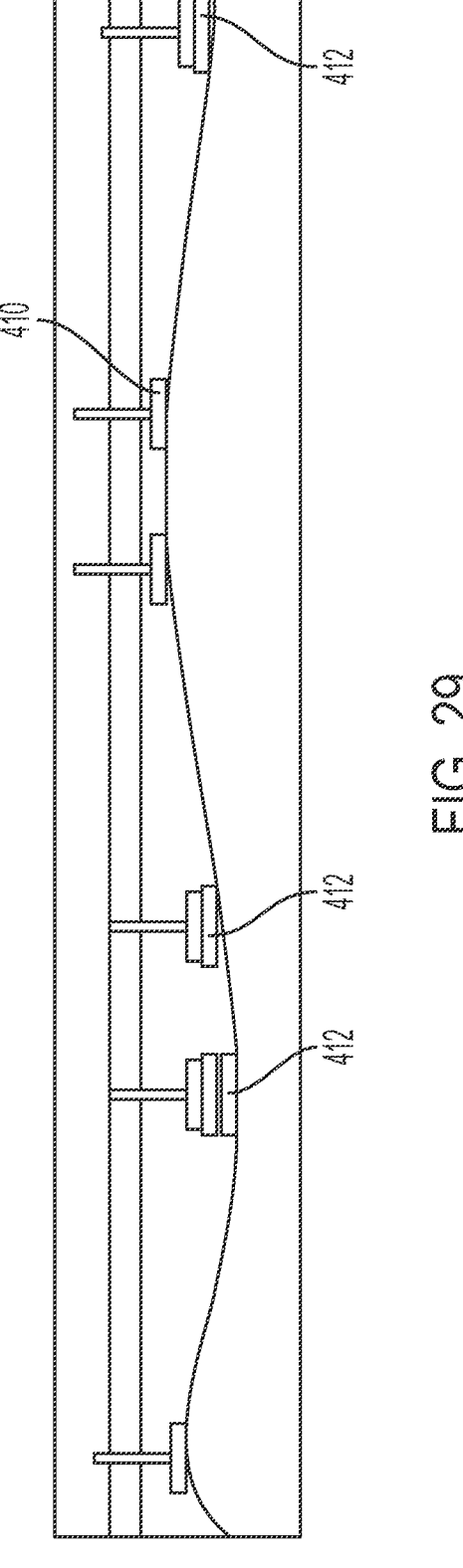
FIG. 29 is a partial side view of a rail assembly disposed on an uneven ground using level adjustment jacks and spacers according to a non-limiting embodiment of the present disclosure.

Referring to FIGS. 26-28, as discussed above, the level adjustment jacks 410 may be configured to support the rail part 401 and/or adjust a distance between the rail part 401 and the ground G. For example, the level adjustment jacks 410 may adjust the distance between the rail part 401 and the ground G so that the rail parts 401 can maintain a flat surface throughout the rail assembly 400 even if the ground on which the rail assemblies are placed is not flat. In some embodiments, the 3D printing system 10 may further include one or more spacers 412, as shown in FIG. 29. The spacers may be disposed under the level adjustment jacks 410 to facilitate the leveling of the rail parts 401, for example, when the surface of the ground is too uneven. In some embodiments, the spacers 412 can also be used to distribute the weight of the 3D printing system 10, for example, when the ground is soft or wet.

In some embodiments, the rail part 401 may further include a plurality of rail rollers 415 disposed at a bottom portion of the rail part 401. The rail rollers 415 may facilitate the assembly of the rail parts because the each rail part 401 can be moved/pushed around the worksite by using the rail rollers 415. In some embodiments, the rail rollers 415 may not be used during an operation of the 3D printing system 10. For example, when the tower assemblies 100 are placed over the rail assemblies 400, it might be desirable not to use the rail rollers 415 to support the rail assemblies 400 (and the tower assemblies 100). In this case, the level adjustment jacks 410 can be used to adjust the distance between the rail parts and the ground so that the rail rollers 415 do not contact the ground. For example, as shown in FIG. 27(a), the level adjustment jacks 410 are raised to an up-position so that the rail rollers 415 contact the ground without an interference of the level adjustment jacks 410, which allows the rail parts 401 to be moved/pushed around the worksite using the rail rollers 415. However, once the assembly of the rail parts 401 is finished, the level adjustment jacks 410 may be lowered to a bottom position to lift the rail rollers 415 off the ground and to level the rail parts 401, as shown in FIG. 27(b). Once the level adjustment jacks 410 are adjusted to be in this position, the tower assemblies 100 may be placed over the rail assemblies 400.

As shown in FIG. 28, the top surface of the slab/foundation may define a horizontal axis 101 parallel to the top surface. In some embodiments, the level adjustment jacks 410 may be adjusted so that the bottom portion of the tower assemblies 100 may be placed near the horizontal axis 101. In some embodiments, the height of the slab/foundation may be in a range of about 2 inches to about 15 inches, preferably about 5 inches to about 10 inches. In other embodiments, the slab/foundation may have any other suitable height. In some embodiments, at least one of the pair of the rail assemblies 400 may be placed at a predetermined distance (e.g., 1-10 inches) apart from the slab/foundation.

Figure 31:
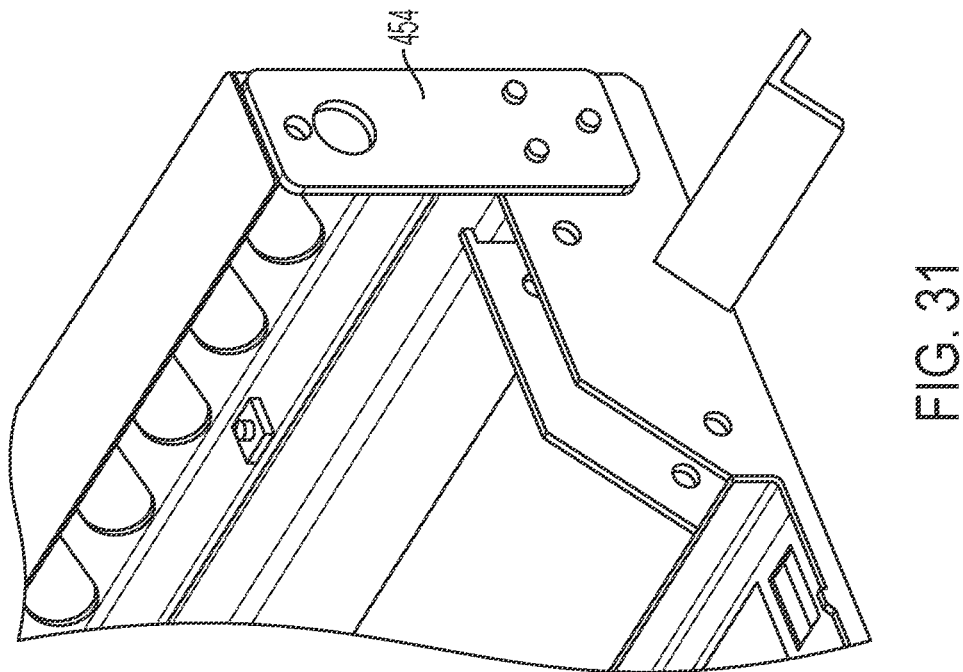
FIG. 31 is a perspective view of a stop bar installed on a rail assembly according to a non-limiting embodiment of the present disclosure.
Figure 30:
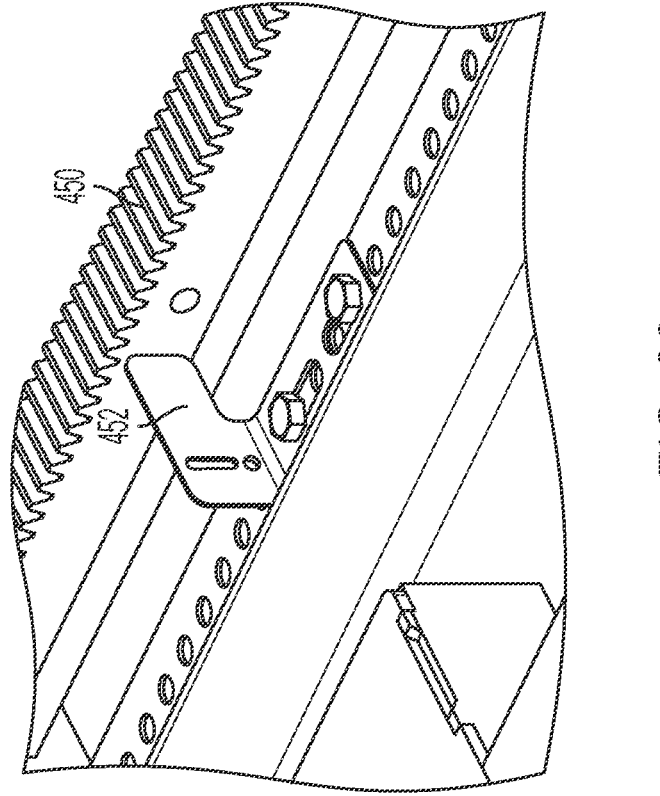
FIG. 30 is a perspective view of a limiter flag installed on a rail assembly according to a non-limiting embodiment of the present disclosure.
Figure 32:
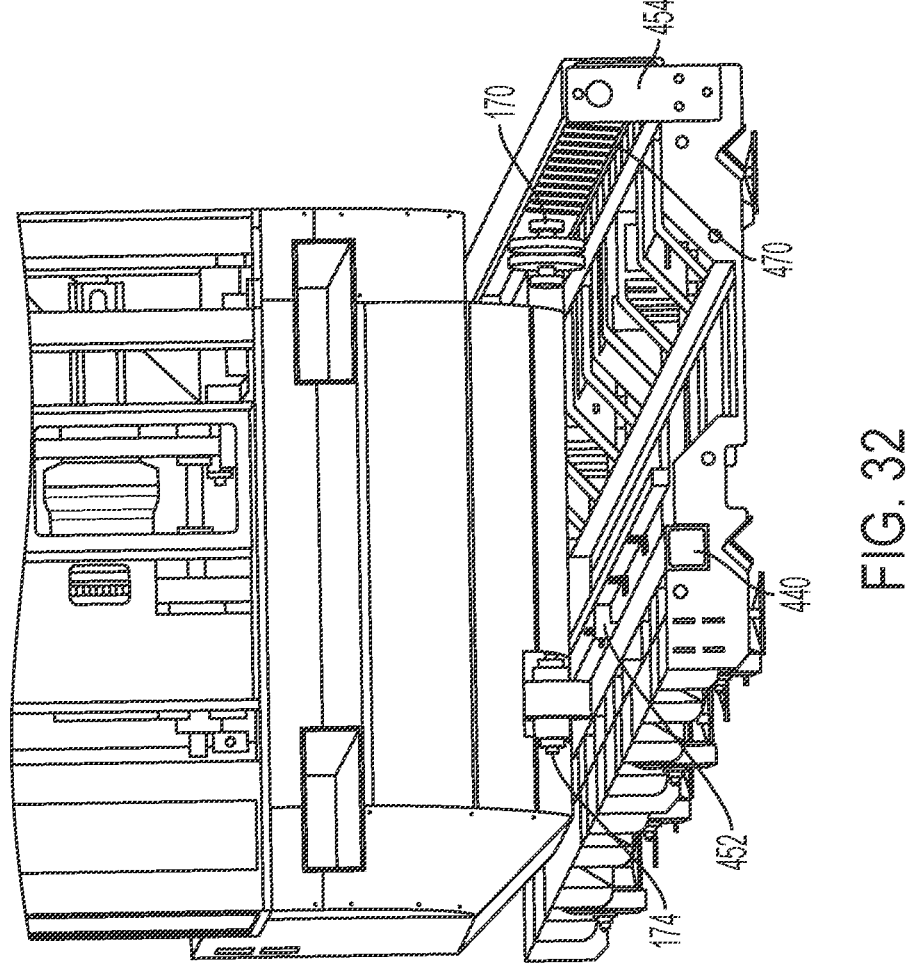
FIG. 32 is a perspective side view of a tower assembly placed on a rail assembly with the limiter flag of FIG. 30 and the stop bar of FIG. 31, respectively, according to a non-limiting embodiment of the present disclosure.

Referring to FIGS. 30-32, in some embodiments, the rail assembly 400 may include a limiter flag 452. The limiter flag 452 may be a sensor that is configured to detect the presence of an object (e.g., tower assembly 100). The limiter flag 452 may send a signal to the central controller (e.g., control system 140) indicating that an object is present or coming near the limiter flag 452. In response to receiving such signal, the central controller may be configured to prevent the tower assembly 100 from traversing over the point where the limiter flat 452 is placed. In this way, the 3D printing system 10 may prevent the tower assemblies 100 from derailing from the rail assemblies 400.

In some embodiments, the limiter flag 452 may be placed near an end portion of the rail assembly 400 (e.g., end portions of both ends of the rail assembly 400 along the longitudinal axis 402). In other embodiments, the limiter flag 452 may be placed at any other suitable place on the rail assemblies 400. The limiter flag 452 may be removably attached to the rail assembly. In some embodiments, the limiter flag 452 may be disposed near the gear rack 450 (e.g., along a perforated strip next to the gear rack), as shown in FIG. 30.

In some embodiments, the rail assembly 400 may further include a stop bar 454 disposed at an end of the rail assembly. The stop bar 454 may be disposed at both ends of the rail assembly 400 (e.g., two stop bars for each rail assembly). The stop bar 454 may be configured to further prevent the tower assemblies 100 from derailing from the rail assemblies 400 (e.g., through the ends of the rail assembly 400) during the operation of the 3D printing system 10. The stop bar 454 may be removably attached to the ends of the rail assemblies 400 so that it can be removed when assembling the tower assembly 100 to the rail assembly 400 and attached after the assembly is over and when the 3D printing system 10 is ready to be operated.

Figure 33:
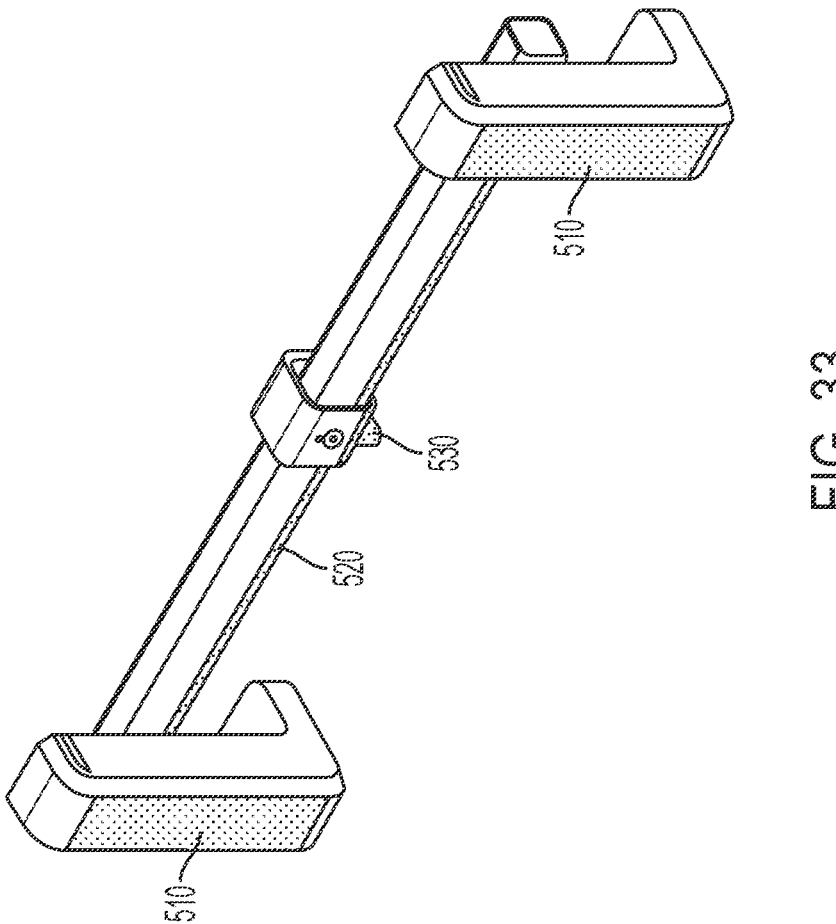
FIG. 33 shows an example 3D printing system with a collision detection system according to a non-limiting embodiment of the present disclosure.

FIG. 33 shows an example 3D printing system 10 with a collision detection system according to an example embodiment of the present disclosure. As illustrated in FIG. 33, the 3D printing system 10 may include a collision detection sensor in a front panel 510 of the tower assemblies 100, a bottom panel 520 of the x-beam assembly 200, and/or a bottom shroud 530 of the shuttle assembly 300. In other embodiments, the 3D printing system 10 may include the collision detection sensors in any other suitable places (e.g., base 160, other panels of the x-beam assembly/shuttle assembly, etc.). In some embodiments, when a collision is detected by the sensor or when an object is detected within a predetermined distance from the respective panel/shroud, the 3D printing system 10 may stop the printing operation and/or the entire system. Examples of the collision detection sensors may include a pressure sensor, an infrared sensor, an ultrasonic sensor, and an optical sensor.

Figure 34:
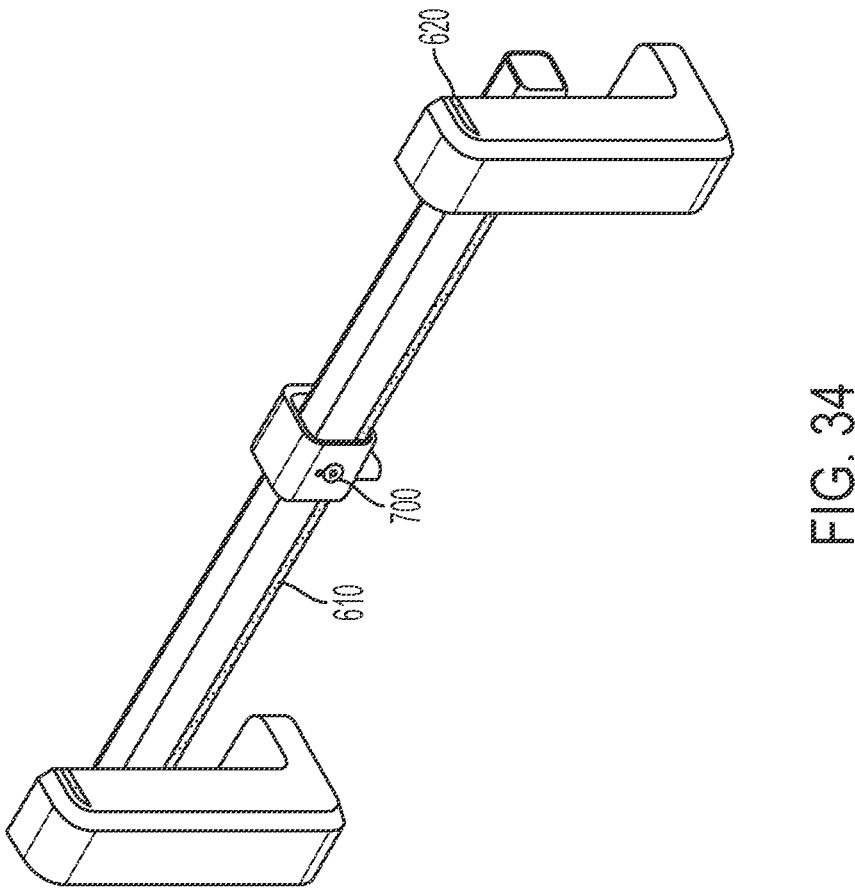
FIG. 34 shows an example 3D printing system with a lighting system according to a non-limiting embodiment of the present disclosure.

FIG. 34 shows an example 3D printing system 10 with a lighting system according to an example embodiment of the present disclosure. As illustrated in FIG. 34, the 3D printing system 10 may include a work site light source in a bottom panel 610 of the x-beam assembly 200 and/or a side panel of the tower assemblies (e.g., an upper portion 620 of the side panel). In other embodiments, the 3D printing system 10 may include the light sources in any other suitable places (e.g., a front/rear panel of the tower assemblies/x-beam assembly, side of the rail assembly, etc.). When an external light source that is located outside the 3D printing system/device is used, the structure/components (e.g., tower assembly, x-beam assembly) of the 3D printing system/device may be placed between the light source and the target place and, thus, it may interfere with the illumination of the target place and 3D printing operation. The work site light sources in the 3D printing system 10 may facilitate the illumination of the entire 3D printing operation 10 without an interference of the illumination, especially, during nighttime.

Figure 35:
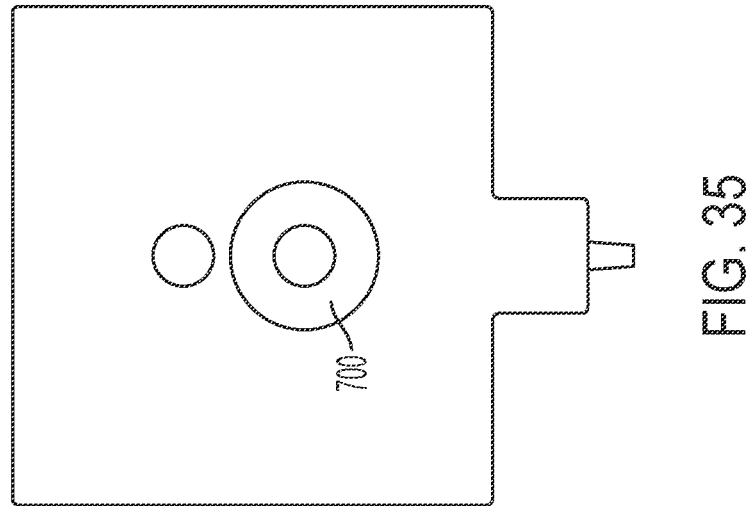
FIG. 35 shows a front view of a shuttle assembly with a status indicating light source according to a non-limiting embodiment of the present disclosure.

As illustrated in FIGS. 34-35, in some embodiments, the 3D printing system 10 may also include a status indicating light source. For example, the 3D printing system 10 may include a status indicating light source 700 on a front panel of the shuttle assembly 300. In other embodiments, the 3D printing system 10 may include a status indicating light source in any other suitable places (e.g., x-beam, tower, rail, other places on the shuttle).

The status indicating light source 700 may have a various color. For example, the status indicating light source 700 may be able to illuminate a white color, a red color, a green color, a blue color, a yellow color, or any combination thereof (e.g., a cyan color, an orange color, etc.). The status indicating light source 700 may be configured to provide a visual indication of the status of the 3D printing system 10. In some embodiments, the status indicating light source 700 may provide the status indication by changing the color of the light source 700. For example, a first color (e.g., white) may indicate a normal status and/or a status showing that the 3D printing system 10 is (fully) energized and/or is ready (for an operation/movement, for example, after a start of the 3D printing system 10). A second color (e.g., blue/cyan) may indicate a status showing that the 3D printing system 10 is moving and/or a commend is received. A third color (e.g., red) may indicate a status showing that there is a system error and/or that the 3D printing system 10 is stopped due to an emergency (emergency stop status). The emergency stop status may occur after the detection of a collision or an object within a predetermined distance by the collision detection sensors discussed above. A fourth color (e.g., yellow) may indicate a system check status or a warning sign. The warning sign may provide a warning that some components of the 3D printing system 10 may need to be replaced, the extrudable building material is not supplied, and/or any other suitable warning matters.

In some embodiments, the status indicating light source 700 may also provide the status indication by blinking the light. The status indicating light source 700 may blink for a predetermined amount of time, for example, when the 3D printing system 10 starts. After the predetermined amount of time, the status indicating light source 700 may return to a solid color without blinking. The frequency of blinking may be different depending on the status of the 3D printing system 10. For example, when the status of the 3D printing system 10 is in a normal state and when the 3D printing system 10 just started, the status indicating light source 700 may blink for a predetermined amount of time (e.g., 2-5 seconds) in a first color (e.g., white color) at a first frequency (e.g., every second). When the status of the 3D printing system 10 is changed to a moving state, the status indicating light source 700 may blink for a predetermined amount of time (e.g., 2-5 seconds) in a second color (e.g., blue/cyan color) at a second frequency (e.g., every half second) and return to a solid color (e.g., blue/cyan color) without blinking.

When the status of the 3D printing system 10 is changed to an emergency stop state, the status indicating light source 700 may blink in a third color (e.g., red color) at a third frequency (e.g., every quarter second). In this case, the status indicating light source 700 may blink for a predetermined amount of time (e.g., for 3-5 minutes). In some cases, the status indicating light source 700 may continue to blink until a user input is entered to the system to release the emergency status. When the status of the 3D printing system 10 is changed to a warning state, the status indicating light source 700 may blink in a fourth color (e.g., yellow color) at a fourth frequency (e.g., every half second or every quarter second). In this case, the status indicating light source 700 may blink for a predetermined amount of time (e.g., for three minutes) and return to a solid color (e.g., yellow color). In some cases, the status indicating light source 700 may continue to blink until a user input is entered to the system.

Figure 36:
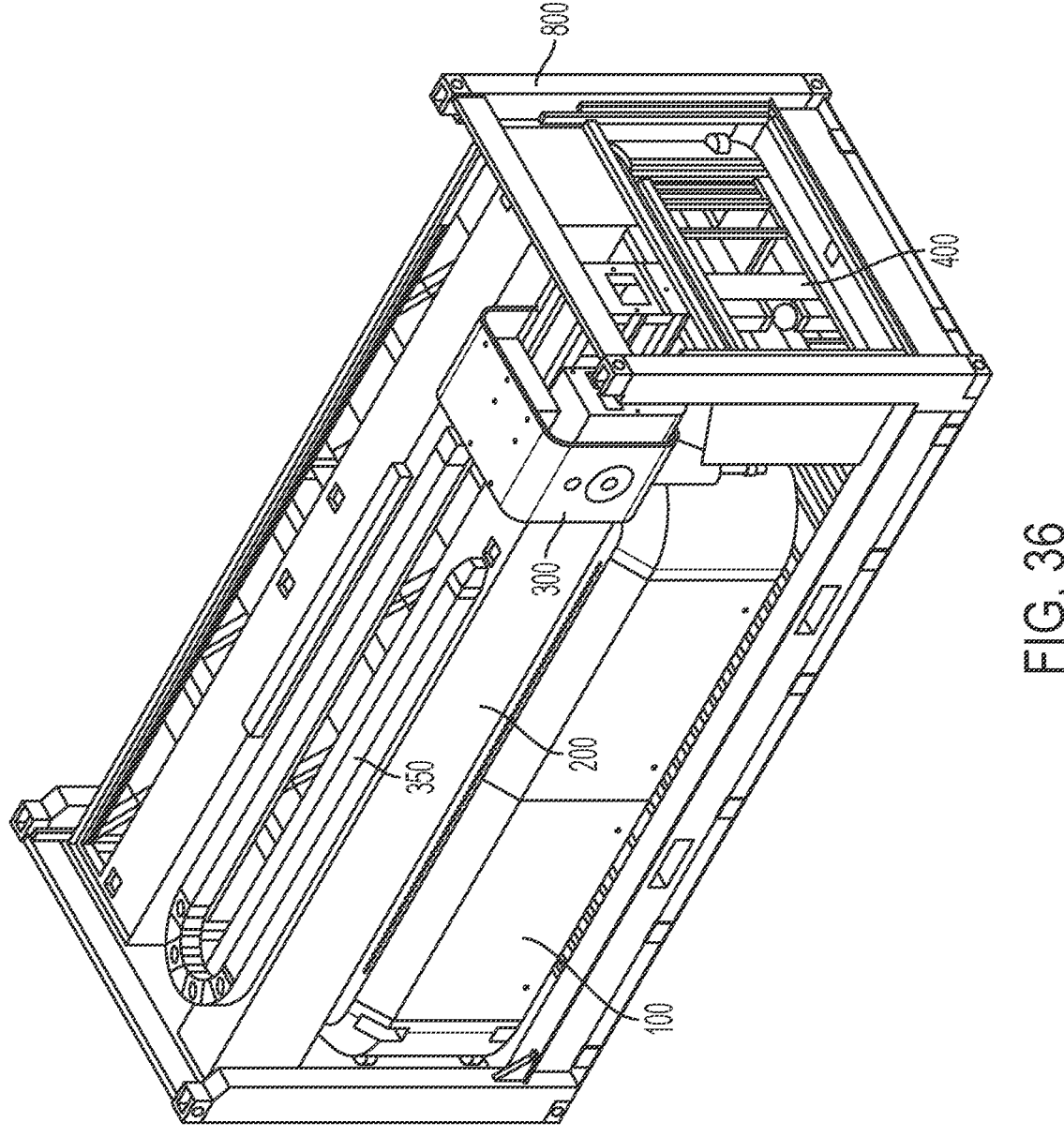
FIG. 36 shows tower assemblies, an x-beam assembly, a shuttle assembly, and rail assemblies disassembled and placed in a container according to a non-limiting embodiment of the present disclosure.

Referring to FIG. 36, since the tower assemblies 100, x-beam assembly 200, shuttle assembly 300, and rail assemblies 400 are modulated, they can be easily disassembled to be placed in a standard (e.g., 20 feet) container 800, thereby allowing the 3D printing system 10 to be shipped to a target place easily and cost-effectively. Once the disassembled 3D printing system 10 arrives at a target/build location, the tower assemblies 100, x-beam assembly 200, shuttle assembly 300, and rail assemblies 400 can be unloaded (e.g., using a forklift) from the container 800, and each modules can be re-assembled.

Reference throughout the specification to "various aspects," "some aspects," "some embodiments," "other embodiments," or "one aspect" means that a particular feature, structure, or characteristic described in connection with the aspect is included in at least one example. Thus, appearances of the phrases "in various aspects," "in some aspects," "certain embodiments," "some embodiments," "other embodiments," "certain other embodiments," or "in one aspect" in places throughout the specification are not necessarily all referring to the same aspect. Furthermore, the particular features, structures, or characteristics illustrated or described in connection with one example may be combined, in whole or in part, with features, structures, or characteristics of one or more other aspects without limitation.

It is to be understood that at least some of the figures and descriptions herein have been simplified to illustrate elements that are relevant for a clear understanding of the disclosure, while eliminating, for purposes of clarity, other elements. Those of ordinary skill in the art will recognize, however, that these and other elements may be desirable. However, because such elements are well known in the art, and because they do not facilitate a better understanding of the disclosure, a discussion of such elements is not provided herein.

The terminology used herein is intended to describe particular embodiments only and is not intended to be limiting of the present disclosure. As used herein, the singular forms "a," "an," and "the" are intended to include the plural forms as well, unless otherwise indicated. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term 'at least one of X or Y' should be interpreted as X, or Y, or X and Y.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A 3D printing system for construction, the 3D printing system comprising:

a 3D printing assembly comprising a pair of tower assemblies;

a pair of rail assemblies, wherein the pair of tower assemblies are movably disposed on the pair of rail assemblies, wherein each of the pair of rail assemblies defines a longitudinal axis and the pair of tower assemblies are configured to move on the pair of rail assemblies in a direction along the longitudinal axis, wherein each of the rail assemblies comprise a plurality of rail parts, wherein each of the rail parts comprises:

a first track extending along the longitudinal axis, the first track having a side cover, the side cover comprises a bottom surface portion, a vertical side portion, and a top surface portion;

a first elongate protrusion formed on the bottom surface portion and a second elongate protrusion formed on the top surface portion, the first elongate protrusion and the second elongate protrusion forming at least a portion of the first track;

a second track extending along the longitudinal axis;

an aligning protrusion at a first end portion of the second track; and an aligning groove at a second end portion of the second track, wherein the aligning groove is configured to accept the aligning protrusion of an adjacent rail part; and a drag chain including a hose configured to transfer extrudable building material to a shuttle assembly, the second track comprising a drag chain track configured to accept the drag chain into a drag hole disposed in a base in each of the pair of tower assemblies, the drag chain being flexibly coupled to one or both of the tower assemblies and configured as a supply conduit of the extrudable building material, the drag chain and the hose being moved through the drag hole as the pair of tower assemblies move along the pair of rail assemblies.

2. The 3D printing system of claim 1, wherein the aligning protrusion and the aligning groove are formed at a bottom portion of the first end portion and the second end portion respectively.

3. The 3D printing system of claim 1, wherein each of the rail parts further comprises:

a first hole at the first end portion; and a second hole at the second end portion, wherein the second hole is configured to be secured with the first hole of an adjacent rail part through a fastener.

4. The 3D printing system of claim 1, wherein each of the rail parts further comprises: a level adjustment jack configured to support each of the rail parts and adjust a distance between a corresponding rail part and a ground.

5. The 3D printing system of claim 4, wherein each of the rail parts further comprises a plurality of rail rollers disposed at a bottom portion of each of the rail parts.

6. The 3D printing system of claim 5, wherein the level adjustment jack is configured to adjust the distance between the corresponding rail part and the ground so that the rail rollers do not contact the ground during a printing operation of the 3D printing system.

7. The 3D printing system of claim 4, further comprising a spacer configured to be disposed under the level adjustment jack to level the rail parts.

8. The 3D printing system of claim 1, wherein each of the rail parts further comprises a forklifting hole at a side portion of each of the rail parts.

9. The 3D printing system of claim 1, wherein each of the rail assemblies comprises a stop bar disposed at an end portion of each of the rail assemblies.

10. The 3D printing system of claim 1, wherein each of the rail assemblies comprises a limiter flag.

11. The 3D printing system of claim 1, wherein the second track comprises a first roller track and each of the pair of tower assemblies further comprise rollers configured to move in the direction along the longitudinal axis on the first roller track.

12. The 3D printing system of claim 1, wherein each of the rail parts further comprises a gear rack extending along the longitudinal axis, wherein each of the pair of tower assemblies further comprise a gear and the gear rack is configured to be mated with the gear of the pair of tower assemblies.

13. The 3D printing system of claim 1, wherein the 3D printing assembly further comprises a beam assembly extending in a direction perpendicular to the longitudinal axis and movably coupled to each of the tower assemblies.

14. The 3D printing system of claim 13, wherein the 3D printing assembly further comprises the shuttle assembly movably disposed on the beam assembly and configured to deposit an extrudable building material to form a structure.

15. A 3D printing system for construction, the 3D printing system comprising:

a 3D printing assembly comprising tower assemblies; and rail assemblies, wherein the tower assemblies are movably disposed on the rail assemblies, wherein each of the rail assemblies defines a longitudinal axis and the tower assemblies are configured to move on the rail assemblies in a direction along the longitudinal axis, wherein each of the rail assemblies comprise a plurality of rail parts, wherein each of the rail parts comprises:

a first track extending along the longitudinal axis, the first track having a side cover, the side cover comprises a bottom surface portion, a vertical side portion, and a top surface portion;

a first elongate protrusion formed on the bottom surface portion and a second elongate protrusion formed on the top surface portion, the first elongate protrusion and the second elongate protrusion forming at least a portion of the first track;

a second track extending along the longitudinal axis;

an aligning protrusion at a first end portion of the second track;

an aligning groove at a second end portion of the second track, wherein the aligning groove is configured to accept the aligning protrusion of an adjacent rail part;

a level adjustment jack configured to support each of the rail parts and adjust a distance between a corresponding rail part and a ground; and a drag chain including a hose configured to transfer extrudable building material to a shuttle assembly, the second track comprising a drag chain track configured to accept the drag chain into a drag hole disposed in a base in each of the tower assemblies, the drag chain being flexibly coupled to at least one of the tower assemblies and configured as a supply conduit of the extrudable building material, the drag chain and the hose being moved through the drag hole as the tower assemblies move along the rail assemblies.

16. The 3D printing system of claim 15, wherein each of the rail parts further comprises a plurality of rail rollers disposed at a bottom portion of each of the rail parts.

17. The 3D printing system of claim 16, wherein the level adjustment jack is configured to adjust the distance between the corresponding rail part and the ground so that the rail rollers do not contact the ground during a printing operation of the 3D printing system.

18. The 3D printing system of claim 15, wherein the second track comprises a first roller track and each of the tower assemblies further comprise rollers configured to move on the first roller track in the direction along the longitudinal axis.

* * * * *